US009736420B2

(12) United States Patent
Minaguchi et al.

(10) Patent No.: US 9,736,420 B2
(45) Date of Patent: Aug. 15, 2017

(54) TELEVISION RECEIVER AND ELECTRONIC DEVICE

(71) Applicant: KABUSHIKI KAISHA TOSHIBA, Tokyo (JP)

(72) Inventors: Hiroyuki Minaguchi, Saitama (JP); Ryosuke Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 945 days.

(21) Appl. No.: 13/662,109

(22) Filed: Oct. 26, 2012

(65) Prior Publication Data
US 2013/0107141 A1    May 2, 2013

(30) Foreign Application Priority Data
Oct. 28, 2011    (JP) .................. 2011-238020

(51) Int. Cl.
*H04N 5/00*    (2011.01)
*H04N 5/64*    (2006.01)
*H05K 5/02*    (2006.01)

(52) U.S. Cl.
CPC .............. *H04N 5/64* (2013.01); *H05K 5/02* (2013.01)

(58) Field of Classification Search
CPC .......... H04N 5/64; H04N 5/645; H04N 5/655; H04N 5/642; G06F 1/1601; F16M 11/10; F16M 11/02; F16M 2200/041; F16M 2200/024; F16M 2200/021; F16M 2200/08; B60K 35/00; B60K 37/06; B60K 2350/1028; B60K 2350/1024; B60R 11/0235; B60R 2011/0015; H05K 7/00; H05K 5/03
See application file for complete search history.

(56) References Cited

U.S. PATENT DOCUMENTS

| | | | | |
|---|---|---|---|---|
| 4,525,746 A | * | 6/1985 | Mangold | H04N 5/64 348/838 |
| 4,726,633 A | * | 2/1988 | Noble | F16M 11/10 248/421 |
| 5,847,685 A | * | 12/1998 | Otsuki | B60K 35/00 248/920 |

(Continued)

FOREIGN PATENT DOCUMENTS

| | | |
|---|---|---|
| JP | 2002-299786 | 10/2002 |
| JP | 2004-031977 | 1/2004 |
| JP | 2011-159081 A1 | 8/2011 |

OTHER PUBLICATIONS

Office Action received in Japanese Patent Application No. 2011-238020, dated Apr. 16, 2013, in 5 pages.

*Primary Examiner* — Frank Huang
(74) *Attorney, Agent, or Firm* — Knobbe, Martens, Olson & Bear, LLP

(57) ABSTRACT

According to one embodiment, an electronic device includes: a housing configured to house an electronic component; a first housing member comprising a first wall; a second housing member comprising a second wall overlapping the first wall with a gap therebetween; a first connecting structure configured to fix the first wall and the second wall; a second connecting structure positioned closer to an end of the first wall or the second wall than the first connecting structure and configured to connect the first wall and the second wall with play between the first wall and the second wall.

8 Claims, 14 Drawing Sheets

(56) References Cited

U.S. PATENT DOCUMENTS

| | | | | |
|---|---|---|---|---|
| 7,758,117 B2* | 7/2010 | Chang | ............ | B60R 11/0235 |
| | | | | 297/217.1 |
| 8,283,550 B2* | 10/2012 | Chu | ............ | G10H 1/32 |
| | | | | 434/307 A |
| 8,625,034 B2* | 1/2014 | Campbell | ............ | B60K 35/00 |
| | | | | 297/217.3 |
| 8,724,037 B1* | 5/2014 | Massey | ............ | H04N 5/655 |
| | | | | 348/836 |
| 8,749,961 B2* | 6/2014 | Hong | ............ | F16M 11/10 |
| | | | | 248/276.1 |
| 8,879,244 B2* | 11/2014 | Yoshimatsu | ............ | H04N 5/64 |
| | | | | 348/794 |
| 9,010,707 B2* | 4/2015 | In | ............ | A47G 1/164 |
| | | | | 248/295.11 |
| 9,282,833 B2* | 3/2016 | Park | ............ | A47G 1/18 |
| 9,296,340 B2* | 3/2016 | Ackeret | ............ | F16M 11/105 |
| 2011/0188224 A1 | 8/2011 | Sugai et al. | | |

\* cited by examiner

TELEVISION RECEIVER AND ELECTRONIC DEVICE

CROSS-REFERENCE TO RELATED APPLICATIONS

This application is based upon and claims the benefit of priority from Japanese Patent Application No. 2011-238020, filed Oct. 28, 2011, the entire contents of which are incorporated herein by reference.

FIELD

Embodiments described herein relate generally to a television receiver and an electronic device.

BACKGROUND

Conventionally, some electronic devices are known whose housings are constructed with a plurality of housing members combined.

In such electronic devices, as an example, it is desirable to be hard to cause inconveniences such as distortion of the housings.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
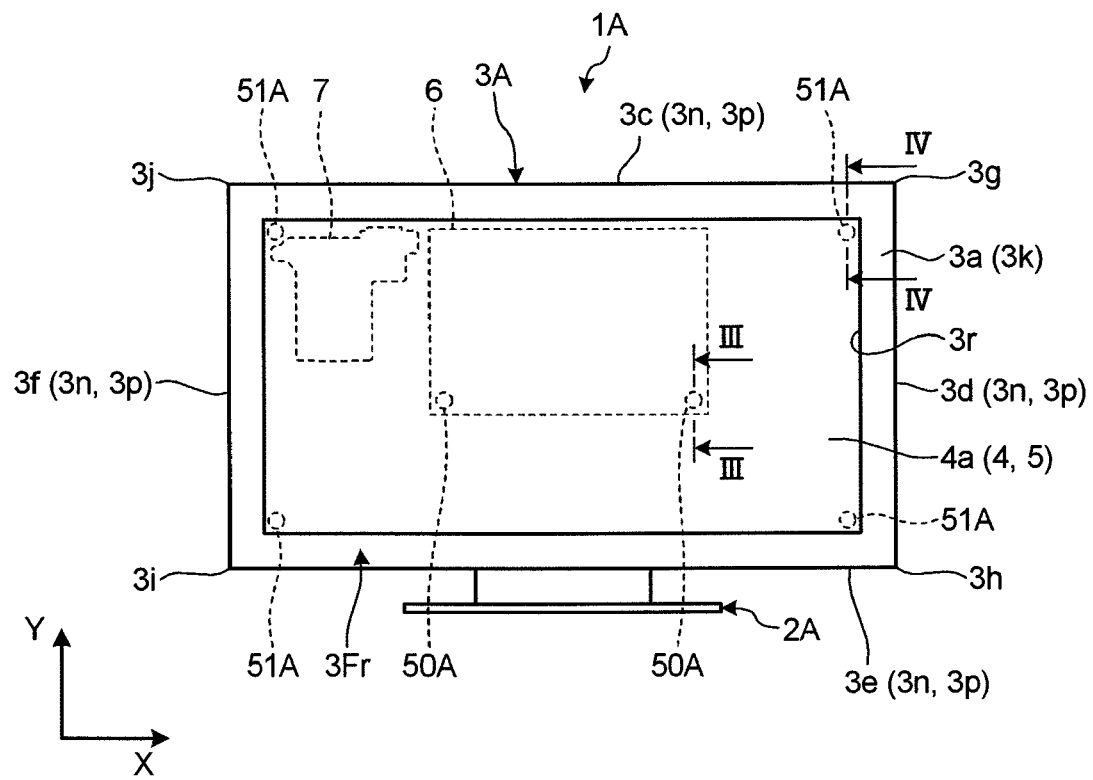
FIG. 1 is an exemplary front view illustrating an example of a television receiver according to a first embodiment.

In general, according to one embodiment, a television receiver comprises: a display device comprising a display screen and an edge located at an area other than the display screen; a first member configured to cover at least a part of the edge of the display device; a second member comprising a first wall facing the display device from an opposite side to the display screen; a third member positioned between the second member and the display device and comprising a second wall covering the display device on an opposite side to the display screen; an electronic component supported by the third member and electrically connected with the display device; a fixing portion configured to extend to the first wall and the second wall and to fix the first wall and the second wall; and a connecting portion fixed to at least one of the first wall and the second wall, comprising an engaging portion engaging the other of the first wall and the second wall in a direction along the first wall and the second wall and in a direction crossing the first wall and the second wall, and positioned closer to an end of the first wall or the second wall than the fixing portion, the connecting portion being configured to connect the first wall and the second wall to be movable relative to each other.

A plurality of exemplary embodiments and modifications in the following include the same constituent elements. Accordingly, in the following, the same constituent elements are given with common reference numerals, and their redundant explanations are omitted. In appropriate drawings, directions (X direction, Y direction, and Z direction) are indicated for the sake of convenience. The X direction is a longer direction with respect to the frontal view of a display screen of a television receiver, the Y direction is a shorter direction with respect to the frontal view of the display screen, and the Z direction is a front-back direction (depth direction or thickness direction of a housing) with respect to the frontal view of the display screen. The X direction, the Y direction, and the Z direction are orthogonal to one another.

While an electronic device is exemplified to be constructed as a television receiver or as a tablet or a slate personal computer in the following embodiments, the electronic device according to the embodiments is not restricted as such. The electronic device in the embodiments can be constructed as a variety of electronic devices such as a notebook or a desktop personal computer, a smartphone, a smart-television, a smartbook, a cellular phone, a personal digital assistant (PDA), a video display device, and a videophone.

First Embodiment

Figure 2:
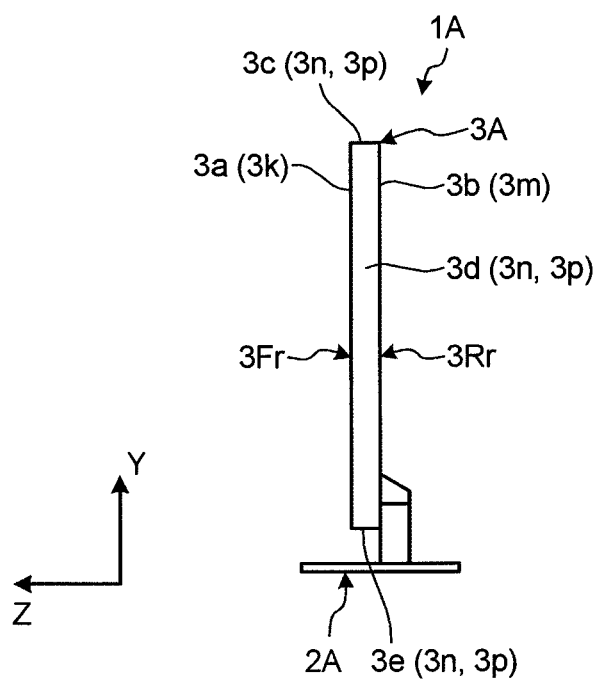
FIG. 2 is an exemplary side view illustrating the example of the television receiver in the first embodiment.

A television receiver 1A that is an example of an electronic device according to a first embodiment, as illustrated in FIGS. 1 and 2, comprises a supporting portion 2A (a support, a pedestal, or a stand) and a housing 3A. A supporting portion 2A is placed on a placing portion such as a desk, a shelf, and a pedestal (a placement surface, not depicted) and supports the housing 3A. The supporting portion 2A may support the housing 3A fixedly, or to be movable (rotational or slidable). Examples of the rotational form of the housing 3A with respect to the supporting portion 2A include tilting, swiveling, and pivoting.

The housing 3A, as illustrated in FIG. 1, is constructed in a square shape (rectangular as an example in the first embodiment) in the frontal view. The housing 3A, as illustrated in FIG. 2, is further constructed in a rectangular parallelepiped shape being thin and flat in the front-back direction. The housing 3A comprises a front surface 3a (a front face, a surface, a first surface, or a first surface portion) and a rear surface 3b (a back face, a surface, a second surface, or a second surface portion) on the opposite side to the front surface 3a. The front surface 3a and the rear surface 3b are approximately parallel to each other. The housing 3A, as illustrated in FIG. 1, in the frontal view, further comprises four ends 3c to 3f (sides or edges) and four corners 3g to 3j (projecting portions, rounded portions, or ends). The ends 3c and 3e are examples of long sides. The ends 3d and 3f are examples of short sides.

The housing 3A further comprises a wall 3k (a first portion, a plate, a frame, a front wall, a surface wall, or a top wall) that includes the front surface 3a, and a wall 3m (a second portion, a plate, a rear wall, a back wall, or a bottom wall) that includes the rear surface 3b. The walls 3k and 3m are in a square shape (in a rectangular shape as an example in the first embodiment). The housing 3A further comprises four walls 3n (third portions, plates, side walls, end walls, standing walls, or spanning portions) that include side surfaces 3p (surfaces, circumferential surfaces, or third surfaces) which span between the wall 3k and the wall 3m. On the wall 3k, as an example, an opening 3r in a square shape is provided.

Furthermore, the housing 3A can be constructed with a plurality of components (separate bodies or members) combined. The housing 3A comprises, as an example, a first member 3Fr (a first portion, a front side member, or a cover) that includes at least the wall 3k, and a second member 3Rr (a second portion, a rear side member, a base, or a bottom) that includes at least the wall 3m. The walls 3n can be included in at least one of the first member 3Fr or the second member 3Rr (for example, the second member 3Rr). Moreover, separately from the first member 3Fr and the second member 3Rr, the housing 3A comprises a third member 3Md (a third portion, an intermediate member, a partition member, a barrier member, a wall member, an intervening member, an inner plate, a middle plate, or a middle frame, See FIGS. 3 and 4) positioned in between the foregoing. In this case, the walls 3n can be included in the third member. The housing 3A can be constructed with metallic materials, synthetic resin materials, and such.

In the housing 3A, a display device 4 (a display module, a display, or a panel) is housed. A display screen 4a positioned on the front surface 3a side of the display device 4 is exposed towards the front (outwardly) of the housing 3A through the opening 3r, and a user can view the display screen 4a from the front side through the opening 3r. The display device 4 is constructed in a square shape (in a rectangular shape as an example in the first embodiment) in the frontal view. The display device 4 is further constructed in a rectangular parallelepiped shape being thin and flat in the front-back direction. The display device 4, for example, is a liquid crystal display (LCD), an organic electro-luminescent display (OELD), or the like.

On the front side (a surface side or the wall 3k side) of the display device 4, a transparent and relatively thin square shaped input operation panel 5 (a touch panel, a touch sensor, or an operation surface as an example) is provided. The input operation panel 5 covers the display screen 4a. An operator (a user and such) can execute an input process by performing an operation of touching, pressing, or rubbing the input operation panel 5 with, for example, a finger or a stylus, or moving the finger or the stylus near the input operation panel 5. The light emitted from the display screen 4a of the display device 4 passes through the input operation panel 5 and goes out ahead (outwardly) of the housing 3A from the opening 3r of the wall 3k. The input operation panel 5 is an example of an input module.

In the housing 3A, on the rear side (a reverse side, a back side, the wall 3m side, or an opposite side to the display screen 4a) of the display device 4, a plurality of substrates 6 and 7 (circuit boards) are housed. The substrates 6 and 7 are arranged in positions different from each other and are both provided in parallel with the display device 4. Furthermore, the substrates 6 and 7 are provided in a condition of being separated from the walls 3k, 3m, and 3n, more specifically, in a condition where space is formed with the respective walls 3k, 3m, and 3n. It is preferable that the substrates 6 and 7 be arranged side-by-side along the display device 4, not overlapping with each other in a thickness direction of the housing 3A. The substrates 6 and 7 are fixed to the housing 3A (the second member 3Rr or the third member 3Md) with fixing tools, for example, screws.

On the substrates 6 and 7 (first boards, first circuit boards, control boards, or main boards) illustrated in FIG. 1, a plurality of electronic components (components or elements, not depicted) such as a central processing unit (CPU) are mounted. The electronic components include heating elements. On an electronic component (a heating element) of a large heat value, a cooling mechanism (a heat dissipating part or a heat receiving part, not depicted) can be further provided. The substrates 6 and 7 and the electronic components constitute at least a part of a control circuit (not depicted). Examples of the control circuit may include a video signal processing circuit, a tuner, a high-definition multimedia interface (HDMI) signal processor, an audio video (AV) input terminal, a remote control signal receiver, a controller, a selector, an on-screen display interface, a storage module (for example, a read only memory (ROM), a random access memory (RAM), and a hard disk drive (HDD)), and an audio signal processing circuit. The control circuit controls the output of video (for example, movies and still pictures) on the display screen 4a of the display device 4, the output of audio from a speaker (not depicted), light emission of a light emitting diode (LED, not depicted), and such. The display device 4, the speaker, and the LED are examples of output modules.

Figure 3:
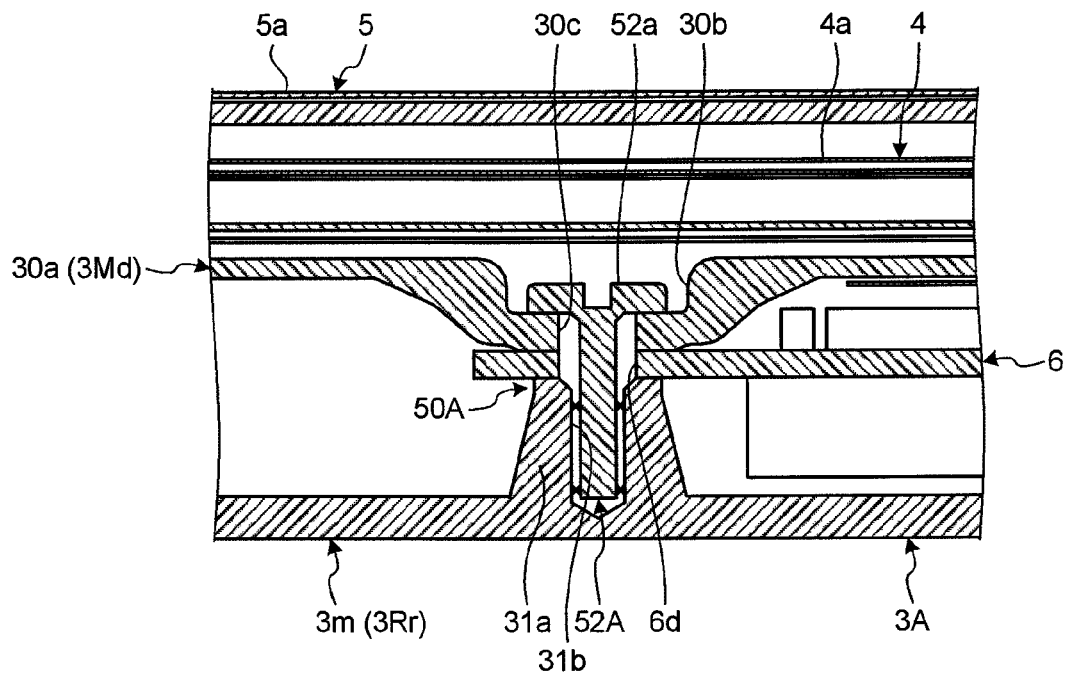
FIG. 3 is an exemplary cross-sectional view viewed along the line in FIG. 1 in the embodiment.
Figure 4:
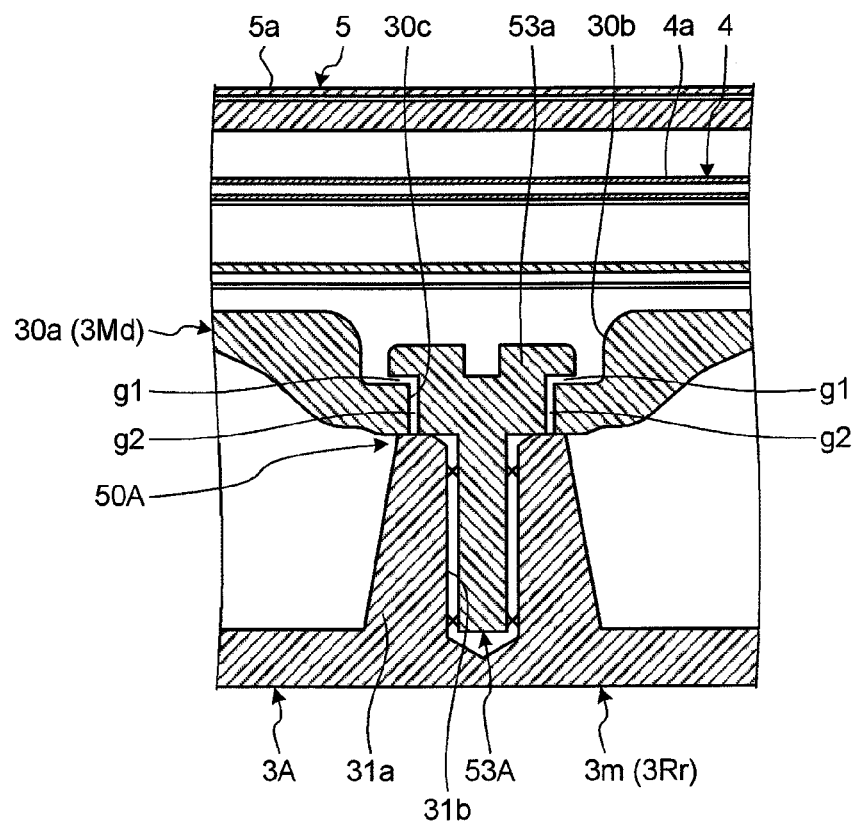
FIG. 4 is an exemplary cross-sectional view viewed along the line IV-IV in FIG. 1 in the embodiment.

In the first embodiment, as an example, as illustrated in FIGS. 1, 3, and 4, in the housing 3A, the second member 3Rr (a housing member) and the third member 3Md (a housing member) are connected via fixing structures 50A (fixing portions, first connecting portions, first connecting structures) and connecting structures 51A (connecting portions, second connecting portions, second connecting structures). Specifically, in the fixing structure 50A, the second member 3Rr (the wall 3m thereof) and the third member 3Md (a wall 30a thereof) are fixedly connected. The fixing structure 50A extends over the second member 3Rr (the wall 3m thereof) and the third member 3Md (the wall 30a thereof) and fixes the second member 3Rr (the wall 3m thereof) and the third member 3Md (the wall 30a thereof). In the connecting structure 51A, the second member 3Rr (the wall 3m thereof) and the third member 3Md (the wall 30a thereof) are connected to be movable (displaceable) relative to each other within a predetermined range. In the first embodiment, the wall 3m is an example of a first wall, and the wall 30a is an example of a second wall.

When two of the members constituting the housing 3A (in the first embodiment, the second member 3Rr and the third member 3Md, as an example) are fixed at a plurality of places, a minute displacement between the two members is caused on at least one of the fixing portions by external forces, heat, residual stresses, and such applied afterwards. When the displaced condition is held at the fixing portion, a deflection on at least one of the two members is likely to be caused by the displacement. When such deflection is caused, distortion (bends, irregularities, and the like) is likely to be caused on the housing 3A. Accordingly, in the first embodiment, as an example, the connecting structures 51A that connect the two members constituting the housing 3A are provided to be movable (displaceable) within a predetermined range, whereby the deflections of the two members and the distortion of the housing 3A are suppressed. Furthermore, the deflections of the two members and the distortion of the housing 3A tend to become larger as the distance to other connecting portion (a portion where two members are connected with each other) is longer. Accordingly, in the first embodiment, as an example, as illustrated in FIG. 1, the fixing structures 50A are positioned in a central portion in the frontal view (a central portion on the back side of the display screen 4a separated from the ends 3c to 3f and the corners 3g to 3j), and the connecting structures 51A are positioned on the sides towards the ends 3c to 3f or the corners 3g to 3i from the fixing structures 50A. Consequently, in the first embodiment, as an example, the distance to the connecting structure 51A from the fixing structure 50A can be set relatively short, and thus, as an example, the displacement between the second member 3Rr and the third member 3Md in the connecting structure 51A is likely to be smaller.

In the first embodiment, as an example, as illustrated in FIG. 3, in the fixing structure 50A, the wall 3m of the second member 3Rr and the wall 30a of the third member 3Md are fixed by a screw 52A as a connecting member. Furthermore, in the fixing structure 50A, the substrate 6 (a circuit board) is also fixed to the walls 3m and 30a. Specifically, on the wall 30a, a recessed portion 30b is provided, and at the bottom of the recessed portion 30b, an opening 30c is provided. The recessed portion 30b is sunk towards the opposite side of the display device 4. In other words, the recessed portion 30b is opened on the display device 4 side. The substrate 6 is provided with openings 6d. The openings 6d, in the first embodiment, as an example, are provided at ends (sides, edges, or corners) of the substrate 6. The openings 30c and 6d can be provided, for example, as through holes and cutouts. On the wall 3m, a projecting portion 31a is provided to project towards the display device 4 side (an inner side of the housing). On the projecting portion 31a, a female-threaded screw hole 31b is provided as a connecting portion. The screw 52A as a connecting member passes through the openings 30c and 6d and is connected to the female-threaded screw hole 31b provided to the projecting portion 31a as a connecting portion, thereby nipping the wall 30a and the substrate 6 between a head portion 52a of the screw 52A and the projecting portion 31a, whereby the wall 30a (the third member 3Md), the substrate 6, and the wall 3m (the second member 3Rr) are fixed. In the first embodiment, as an example, fixing the substrate 6 together with the second member 3Rr and the third member 3Md in the fixing structure 50A, as compared with a structure in which the substrate 6 is fixed separately, allows the structure to be more simplified. In the first embodiment, as an example, by utilizing the contact of the second member 3Rr, the third member 3Md, and the substrate 6 in the fixing structure 50A, the grounding portions of the second member 3Rr, the third member 3Md, and the substrate 6 can be electrically connected. In the fixing structure 50A, the walls 3m and 30a and the screw 52A are constructed by electrically-conductive materials, and thus, by mutual contact of the walls 3m and 30a, a conductor pattern of the substrate 6 (not depicted), and the screw 52A, the walls 3m and 30a, the conductor pattern of the substrate 6, and the screw 52A are electrically connected.

Meanwhile, in the first embodiment, as an example, as illustrated in FIG. 4, in the connecting structure 51A, the wall 3m of the second member 3Rr and the wall 30a of the third member 3Md are connected to be movable (displaceable) within a predetermined range by a screw 53A as a connecting member. Specifically, the recessed portion 30b is provided to the wall 30a, and at the bottom of the recessed portion 30b, the opening 30c is provided. The recessed portion 30b is sunk towards the opposite side of the display device 4. In other words, the recessed portion 30b is opened on the display device 4 side. On the wall 3m, the projecting portions 31a are provided to project towards the display device 4 side (an inner side of the housing). On the projecting portion 31a, the female-threaded screw hole 31b is provided as a connecting portion. The screw 53A as a connecting member passes through the opening 30c and is connected to the female-threaded screw hole 31b provided to the projecting portion 31a as a connecting portion. However, in the connecting structure 51A, without the screw 53A nipping the wall 30a, a head portion 53a of the screw 53A contacts the projecting portion 31a. In other words, the wall 30a is not nipped between the screw 53A and the projecting portion 31a, and gaps g1 and g2 are provided between the screw 53A and the wall 30a. The gap g1 is a gap formed between the wall 3m (or the screw 53A fixed thereto) and the wall 30a in a direction along the walls 3m and 30a (a left-right direction in FIG. 4 or a direction along the display screen 4a). The gap g2 is a gap formed between the wall 3m (or the screw 53A fixed thereto) and the wall 30a in a direction crossing the walls 3m and 30a (an up-down direction in FIG. 4 or a direction crossing the display screen 4a (in an orthogonal direction as an example)). To the extent of the gaps g1 and g2, the wall 30a (the third member 3Md) can relatively move (move or displace relative to each other) with respect to the wall 3m (the second member 3Rr). In other words, the wall 30a (the third member 3Md) and the wall 3m (the second member 3Rr) are connected to be movable within the range of the gaps g1 and g2. In the connecting structure 51A, the screw 53A is an example of an engaging portion. Furthermore, it can be said that the connecting structure 51A connects the wall 30a (the third member 3Md) and the wall 3m (the second member 3Rr) with some play.

As described in the foregoing, in the first embodiment, as an example, the housing 3A comprises the fixing structures 50A that fix the wall 3m (the second member 3Rr) and the wall 30a (the third member 3Md), and the connecting structures 51A that connect the wall 3m (the second member 3Rr) and the wall 30a (the third member 3Md) with the gaps g1 and g2 to be movable. Accordingly, as an example, a minute displacement held at a fixing portion is likely to be suppressed. Consequently, as an example, the distortion caused on the housing 3A is likely to be suppressed.

Furthermore, in the first embodiment, as an example, the screw 53A, which is an example of an engaging portion fixed to the wall 3m, engages with the circumferential portion of the opening 30c of the wall 30a in a direction along the wall 3m (the second member 3Rr) and the wall 30a (the third member 3Md) and in a direction along the wall 3m (the second member 3Rr) and the wall 30a (the third member 3Md). Accordingly, the connecting structure 51A can be constructed relatively simple. Furthermore, it is not likely to be influenced by external forces and distortion in more directions.

Second Embodiment

An electronic device 1B according to a second embodiment is, for example, a personal computer, a television receiver, a smartphone, a smartbook, a cellular phone, and a PDA of a so-called slate type, a tablet type, or a display device that includes a software keyboard function.

Figure 5:
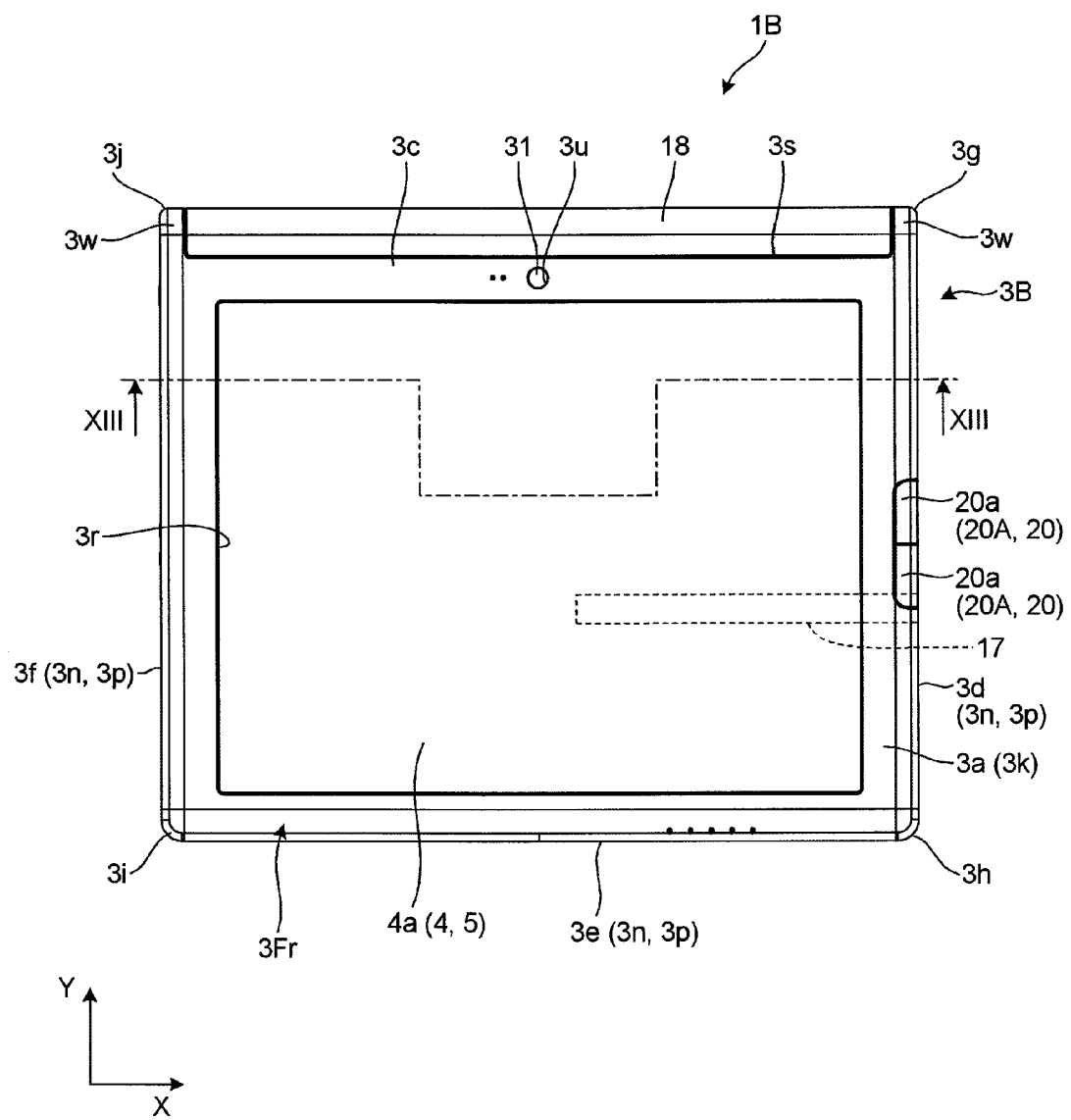
FIG. 5 is an exemplary front view illustrating an example of an electronic device according to a second embodiment.
Figure 6:
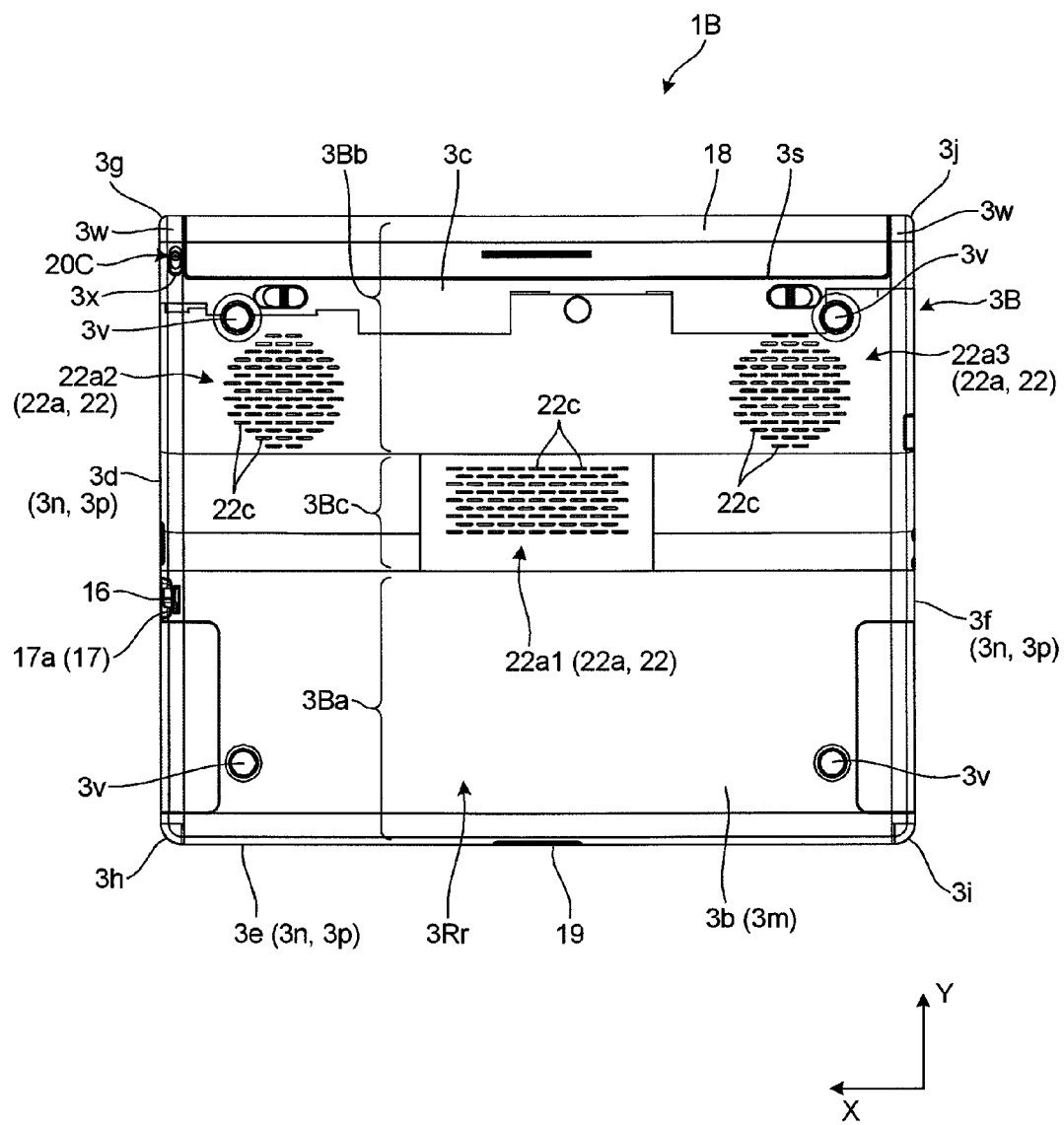
FIG. 6 is an exemplary rear view illustrating the example of the electronic device in the second embodiment.
Figure 7:
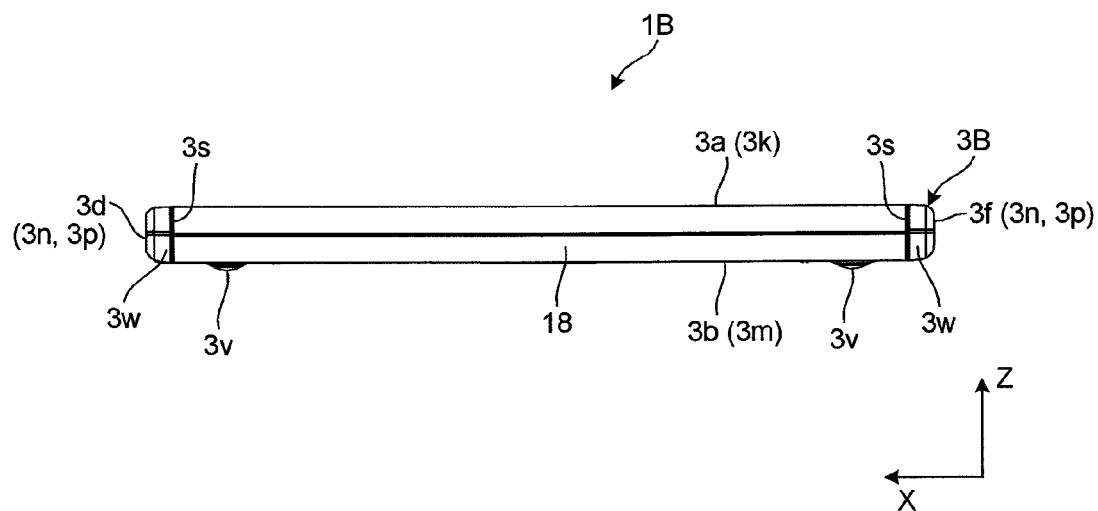
FIG. 7 is an exemplary side view illustrating the example of the electronic device in the second embodiment.
Figure 10:
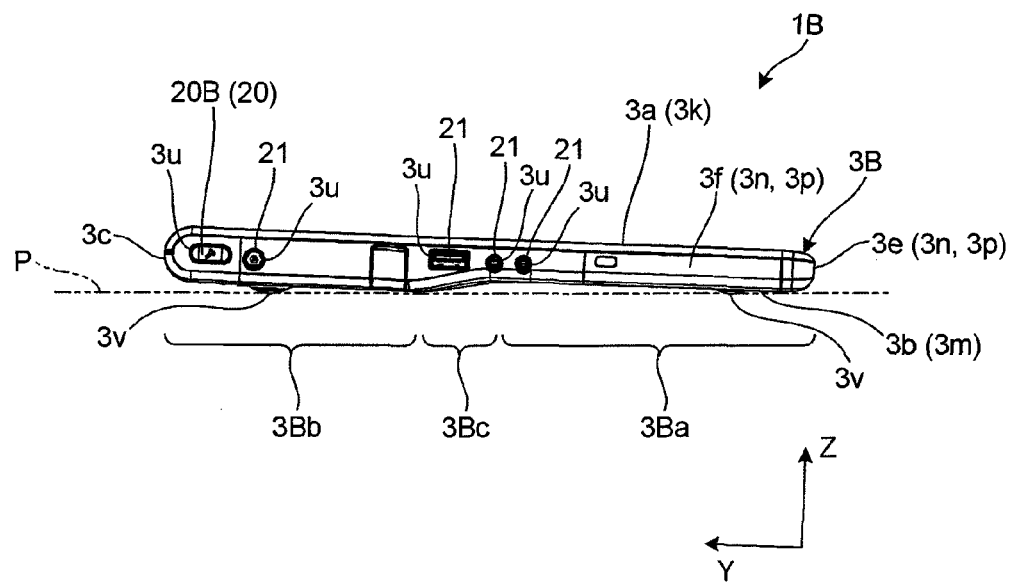
FIG. 10 is an exemplary side view illustrating the example of the electronic device in the second embodiment, but viewed from a different direction from those in FIGS. 7 to 9.

A housing 3B of the electronic device 1B, as illustrated in FIGS. 5 and 6, is constructed in a square shape (in a rectangular shape as an example in the second embodiment) in the frontal view and the back view. The housing 3B, as illustrated in FIGS. 7 and 10, is constructed in a rectangular parallelepiped shape being thin and flat in the front-back direction. The housing 3B comprises the front surface 3a (a front face, a surface, a first surface, or a first surface portion) and the rear surface 3b (a back face, a surface, a second surface, or a second surface portion) on the opposite side to the front surface 3a. The front surface 3a and the rear surface 3b are approximately parallel to each other. The housing 3B, as illustrated in FIGS. 5 and 6, in the frontal view, further comprises the four ends 3c to 3f (sides or edges) and the four corners 3g to 3j (projecting parts, rounded parts, or ends). The ends 3c and 3e are examples of long sides. The ends 3d and 3f are examples of short sides.

The housing 3B further comprises the wall 3k (a wall, a first portion, a plate, a frame, a front wall, a surface wall, or a top wall) that includes the front surface 3a, and the wall 3m (a second wall, a second portion, a plate, a rear wall, a back wall, or a bottom wall) that includes the rear surface 3b. The walls 3k and 3m are in a square shape (in a rectangular shape as an example in the second embodiment). The housing 3B further comprises the four walls 3n (third walls, third portions, plates, side walls, end walls, standing walls, or spanning portions) that include the side surfaces 3p (surfaces, peripheral surfaces, or third surfaces) which span between the wall 3k and the wall 3m. In the wall 3k, as an example, the opening 3r in a square shape is provided.

Figure 11:
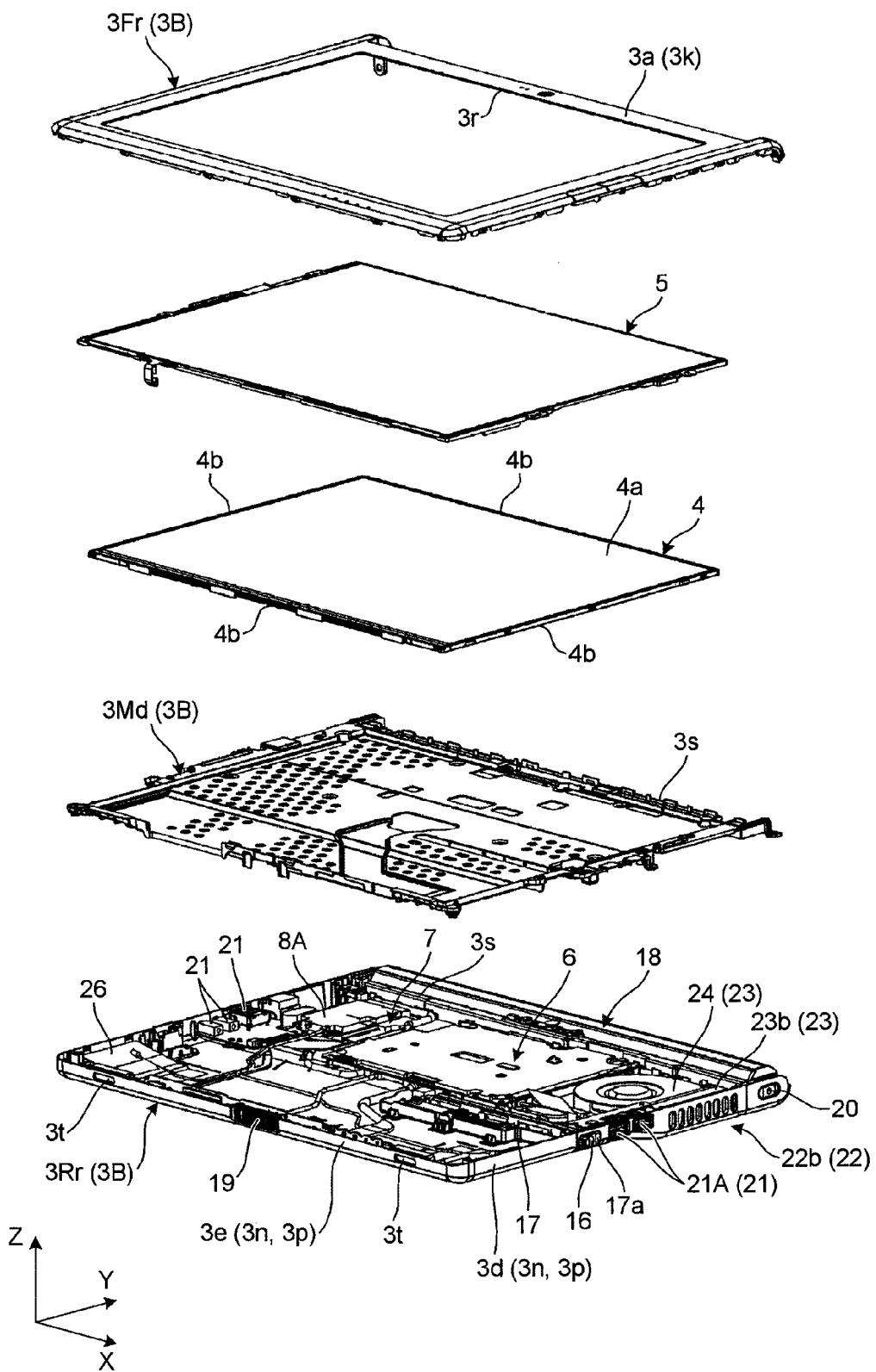
FIG. 11 is an exemplary exploded perspective view illustrating the example of the electronic device in the second embodiment.

Furthermore, the housing 3B can be constructed with a plurality of components (separate bodies) combined. The housing 3B comprises, as an example, the first member 3Fr (a first portion, a front side member, or a cover) that includes at least the wall 3k, and the second member 3Rr (a second portion, a rear side member, a base, or a bottom) that includes at least the wall 3m. The walls 3n are included in at least one of the first member 3Fr or the second member 3Rr (for example, the second member 3Rr). Moreover, in the second embodiment, as illustrated in FIG. 11, separately from the first member 3Fr and the second member 3Rr, the housing 3B comprises a third member 3Md (a third portion, an intermediate member, a partition member, a barrier member, a wall member, an intervening member, an inner plate, a middle plate, or a middle frame) positioned in between the foregoing. A part of the walls 3n can be included in the third member 3Md. The housing 3B can be constructed with metallic materials and synthetic resin materials. As an example, the second member 3Rr and the third member 3Md can be constructed with metallic materials such as magnesium alloy, and the first member 3Fr can be constructed with synthetic resin materials that have a lower rigidity than the second member 3Rr and the third member 3Md. On the first member 3Fr, the second member 3Rr, and the third member 3Md, wall portions such as ribs (projecting portions or projecting walls) can be provided. By the wall portions, the rigidity of the housing 3B is improved. On the third member 3Md, openings such as through holes can be provided. By the openings, the housing 3B can be constructed to be lighter.

Figure 8:
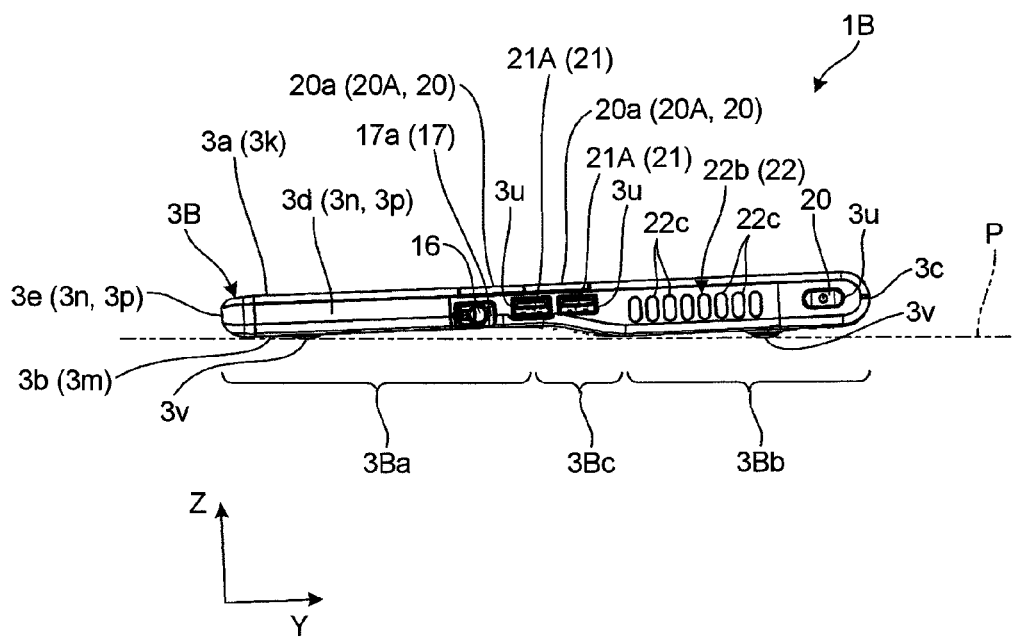
FIG. 8 is an exemplary side view illustrating the example of the electronic device in the second embodiment, but viewed from a different direction from that in FIG. 7.

In the second embodiment, as illustrated in FIGS. 8 and 10, as an example, the thickness of a first part 3Ba that is positioned on a downside or a near side (closer to a user) in a use condition where the longer direction of the electronic device is positioned sideways is thinner than that of a second part 3Bb that is positioned on an upper side or a back side (far from the user) in the use condition. Therefore, in a use condition where the electronic device is placed on a placement surface P such as a desk, the height of the front surface 3a of the housing 3B and that of the display screen 4a from the placement surface P become higher towards the back side (upside) from the near side (downside). Consequently, in accordance with the second embodiment, as an example, the display screen 4a is in a so-called tilted state for the user positioned on the left side in FIG. 8 or on the right side in FIG. 10 with respect to the electronic device 1B, and thus the user is advantageously easy to view the display screen 4a.

Furthermore, the direction of video output on the display screen 4a when in use can be changed corresponding to the position of the housing 3B (the electronic device 1B). For example, a control circuit provided in the housing 3B (not depicted) can change the direction, size, and such of the video output on the display screen 4a in response to the detection result of a sensor (for example, a gyro sensor and an acceleration sensor) provided to the housing 3B. The control circuit can further limit the position of video to some positions. Specifically, for example, the control circuit can display the video the top of which is on the end 3c side on the display screen 4a when the end 3c of the housing 3B is positioned on the upper side than the end 3e (a first position), and when the end 3d is positioned on the upper side than the end 3f (a second position), the control circuit can display the video the top of which is on the end 3d side on the display screen 4a. When the position of the housing 3B is changed from a previous position to the first position or the second position, the control circuit switches the video on the display screen 4a to the video corresponding to the position. However, when the position of the housing 3B is changed from a previous position to a position other than the first position or the second position (more specifically, in this example, the position where the end 3e is positioned on the upper side than the end 3c or the position where the end 3f is positioned on the upper side than the end 3d), the control circuit does not switch the video on the display screen 4a. By such control, the use position of the electronic device 1B by the user can be limited.

To the housing 3B, a component storage 17 that houses a component 16 to be taken in and out is provided. An opening 17a of the component storage 17 in the second embodiment, as an example, is opened to the end 3d. The opening 17a is provided to the end 3d that is set on the upside in any of the use positions (in the above-described example, the first position or the second position) and is not set on the downside in non-use positions. According to such a configuration, the opening 17a is positioned on the upside in the use positions. Consequently, as an example, it makes it easy to suppress falling off of the component 16 to from the component storage 17 due to the action of gravity. The component 16 is specifically, for example, a stylus, a stylus pen, and a pen.

Furthermore, as illustrated in FIG. 5, in the second embodiment, a battery 18 and the display device 4 are not overlapped with each other in the thickness direction of the housing 3B and are arranged in juxtaposition in a direction orthogonal to the thickness direction (a direction along the front surface 3a or the rear surface 3b, the X direction, or the Y direction, and the Y direction as an example in the second embodiment). Accordingly, as an example, compared with when the battery 18 and the display device 4 are overlapped in the thickness direction of the housing 3B, the housing 3B can be constructed thinner. Furthermore, as an example, compared with when the battery 18 and the display device 4 are overlapped in the thickness direction of the housing 3B, it makes it easy not only to make the battery 18 thicker, but also to increase the capacity of the battery 18 per unit volume. Moreover, as illustrated in FIGS. 8 and 10, in the second embodiment, the housing 3B comprises the thin first part 3Ba and the thick second part 3Bb. A battery storage (a battery supporting portion) that houses the battery 18 is provided to the end 3c of the thick second part 3Bb. Consequently, as an example, compared with when the battery storage 3s is provided to the first part 3Ba, it makes it easy not only to make the battery thick, but also to increase the storage capacity of the battery 18 per unit volume.

Figure 9:
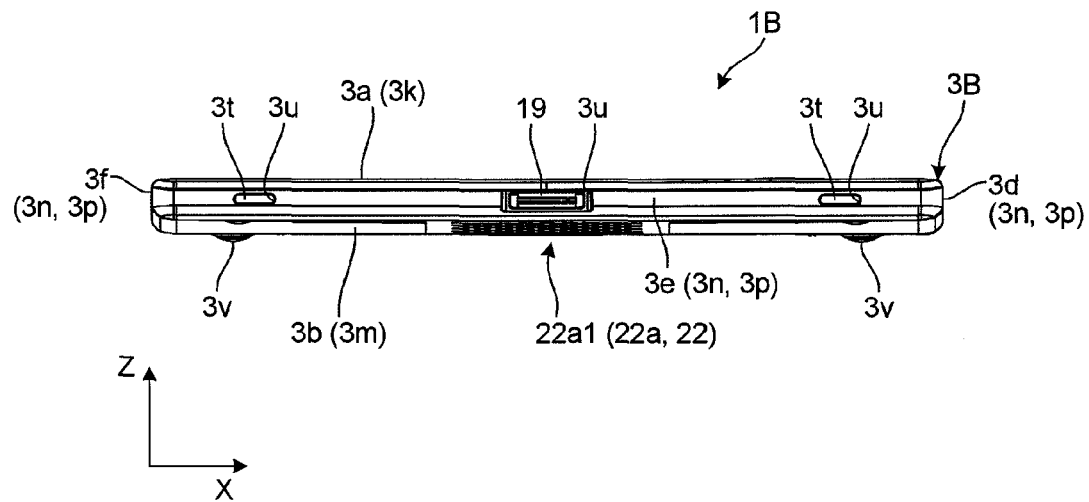
FIG. 9 is an exemplary side view illustrating the example of the electronic device in the second embodiment, but viewed from a different direction from those in FIGS. 7 and 8.

In the second embodiment, the end 3e on the opposite side of the end 3c that is where the battery storage 3s is provided is supported by a docking station (other electronic device, not depicted). Accordingly, as an example, a worker (a user and such) can attach and detach the battery 18 to and from the housing 3B in a condition of the electronic device 1B being supported by the docking station. On the end 3e, as illustrated in FIG. 9, a connector 19 is provided to be connected with a connector (not depicted) of the docking station. Accordingly, as an example, the battery storage 3s and the connector 19 are easily provided to the housing 3B without interfering with each other. On the end 3e, terminals 3t are also exposed. The connector 19 and the terminals 3t are exposed through openings 3u provided to the wall 3n of the end 3e.

In the battery storage 3s, the portions hidden by the battery 18 are provided with connecting portions of any two or more (two or three) of the first member 3Fr, the second member 3Rr, and the third member 3Md of the housing 3B. In the connecting portion, for example, by a screw (not depicted) as an example of a connecting member, the first member 3Fr is connected with the third member 3Md or the second member 3Rr. When disassembling the housing 3B, the worker (user and such) first removes the screw, and locally separates the first member 3Fr and the third member 3Md or the second member 3Rr at this portion to set them apart. The worker then, for example, while applying a force to the portion separated and resiliently deforming the first member 3Fr, releases the connection of a resilient connecting portion (an engaging portion or a coupling portion, as an example, an engaging portion by a claw and an edge of a hole, not depicted) of the first member 3Fr with the third member 3Md or the second member 3Rr to remove the first member 3Fr from the third member 3Md or the second member 3Rr. A plurality of connecting portions (engaging portions or coupling portions) connecting the first member 3Fr with the third member 3Md or the second member 3Rr are provided along the outer circumference of the first member 3Fr. A plurality of screws (not depicted) as connecting members to connect the second member 3Rr and the third member 3Md are all covered by the first member 3Fr. Therefore, the worker removes the first member 3Fr from the third member 3Md or the second member 3Rr so that the screws can be removed to separate the third member 3Md and the second member 3Rr. According to such a configuration, when the battery 18 is removed from the battery storage 3s, the housing 3B can be disassembled smoothly. In other words, the housing 3B to be disassembled in a condition of the battery 18 being attached to the battery storage 3s can be suppressed.

In the second embodiment, the second member 3Rr and the third member 3Md extend to the battery storage 3s and constitute a part of the end 3c (the wall 3n or the side surface 3p). Accordingly, as an example, the rigidity of the housing 3B can be made higher. Because the rigidity of the battery storage becomes higher, as an example, it makes it easy to further suppress the vibration, misalignment, and such of the battery 18.

As illustrated in FIGS. 5 to 10, on the front surface 3a and the side surface 3p of the housing 3B, operating parts 20 and connectors 21 are provided. The operating parts 20 can be push buttons, push switches, slide switches, pointing devices, and such. The connectors 21 are a connector for power cable, USB connectors, connectors for earphone and microphone, and the like. The operating parts 20 and the connectors 21 are exposed through the openings 3u provided to the walls 3k and 3n of the housing 3B. On the front surface 3a, a camera 31 (a camera module or an imaging device) can be provided.

As illustrated in FIGS. 6 and 8, on the rear surface 3b and the side surface 3p of the housing 3B, ventilation holes 22 that introduce or exhaust air used for cooling electronic components 12 and such (see FIG. 13, for example) are provided. In the second embodiment, as an example, on the rear surface 3b (the wall 3m), inlets 22a that introduce air are provided, and on the side surface 3p (the wall 3n or the end 3d), an exhaust outlet 22b is provided. In the second embodiment, the inlets 22a and the exhaust outlet 22b are provided as collective portions of small openings 22c provided to the walls 3m and 3n. Additionally, on the rear surface 3b, protruding portions 3v are provided. Accordingly, even in a condition where the rear surface 3b is placed on the placement surface P as illustrated in FIGS. 8 and 10, the inlets 22a are not blocked. In the second embodiment, in a border portion between the thin first part 3Ba and the thick second part 3Bb, an inclined portion 3Bc is provided. As illustrated in FIG. 6, one inlet 22a1 out of the inlets 22a is provided in the inclined portion 3Bc on the rear surface 3b. As illustrated in FIGS. 8 and 10, because the distance between the inclined portion 3Bc and the placement surface P becomes larger than the distance between the other portions and the placement surface P, an airflow resistance for the inlet 22a1 provided in the inclined portion 3Bc is likely to be reduced, whereby cooling efficiency is made easier to increase. In the second embodiment, a plurality of inlets 22a are provided. Accordingly, as an example, even when one of the inlets 22a is blocked for some reason, the air can be introduced in the housing 3B from the other inlets 22a, whereby the cooling efficiency is not likely to be impaired. The inside of the housing 3B may be cooled by a cooling mechanism 23 (see FIG. 12, for example) or may be cooled by natural cooling (convective cooling).

As illustrated in FIG. 11, also in the second embodiment, between the first member 3Fr and the third member 3Md in the housing 3B, the display device 4 (a display module, a display, or a panel) is housed. The display screen 4a of the display device 4 positioned on the front surface 3a side is exposed towards the front (outwardly) through the opening 3r, and the user can view the display screen 4a from the front side through the opening 3r. The display device 4 is constructed in a square shape (in a rectangular shape as an example in the second embodiment) in the frontal view. The display device 4 is further constructed in a rectangular parallelepiped shape being thin and flat in the front-back direction. The display device 4, for example, is a liquid crystal display (LCD), an organic electro-luminescent display (OELD), or the like.

Furthermore, on the front side (a surface side or the wall 3k side) of the display device 4, the transparent and relatively thin square shaped input operation panel 5 (a touch panel, a touch sensor, or an operation surface as an example) is provided. The input operation panel 5 covers the display screen 4a. An operator (a user and such) can execute an input process by performing an operation such as touching, pressing, or rubbing the input operation panel 5 with, for example, a finger or the component 16 (a stylus), or moving the finger or the stylus near the input operation panel 5. The light emitted from the display screen 4a of the display device 4 passes through the input operation panel 5 and goes out ahead (outwardly) of the housing 3B from the opening 3r of the wall 3k. The input operation panel 5 is an example of an input module.

Figure 13:
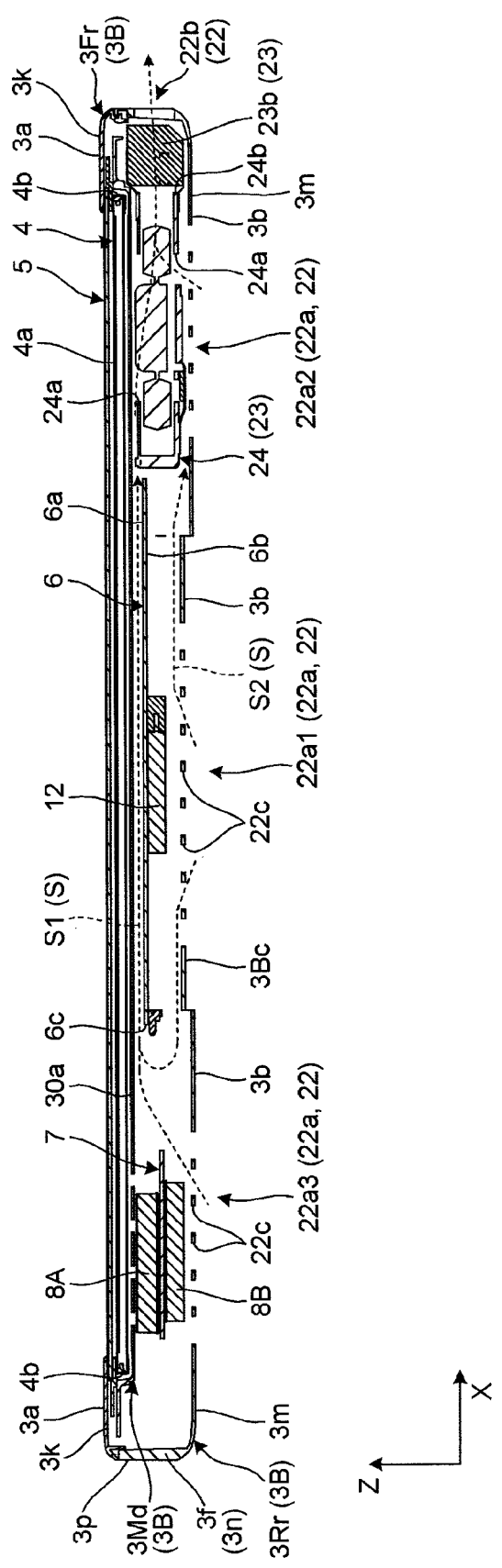
FIG. 13 is an exemplary cross-sectional view viewed along the line XIII-XIII in FIG. 5 in the embodiment.

In the second embodiment, as an example, as illustrated in FIGS. 11 and 13, the first member 3Fr covers at least a part of an edge 4b of the display device 4. The edge 4b is a peripheral portion off the display screen 4a. The second member 3Rr comprises the wall 3m. The wall 3m faces the opposite side to the display screen 4a of the display device 4 and covers the opposite side. The third member 3Md comprises the wall 30a. The wall 30a faces the opposite side to the display screen 4a of the display device 4 and covers the opposite side. The wall 30a is positioned between the wall 3m and the display device 4.

Figure 12:
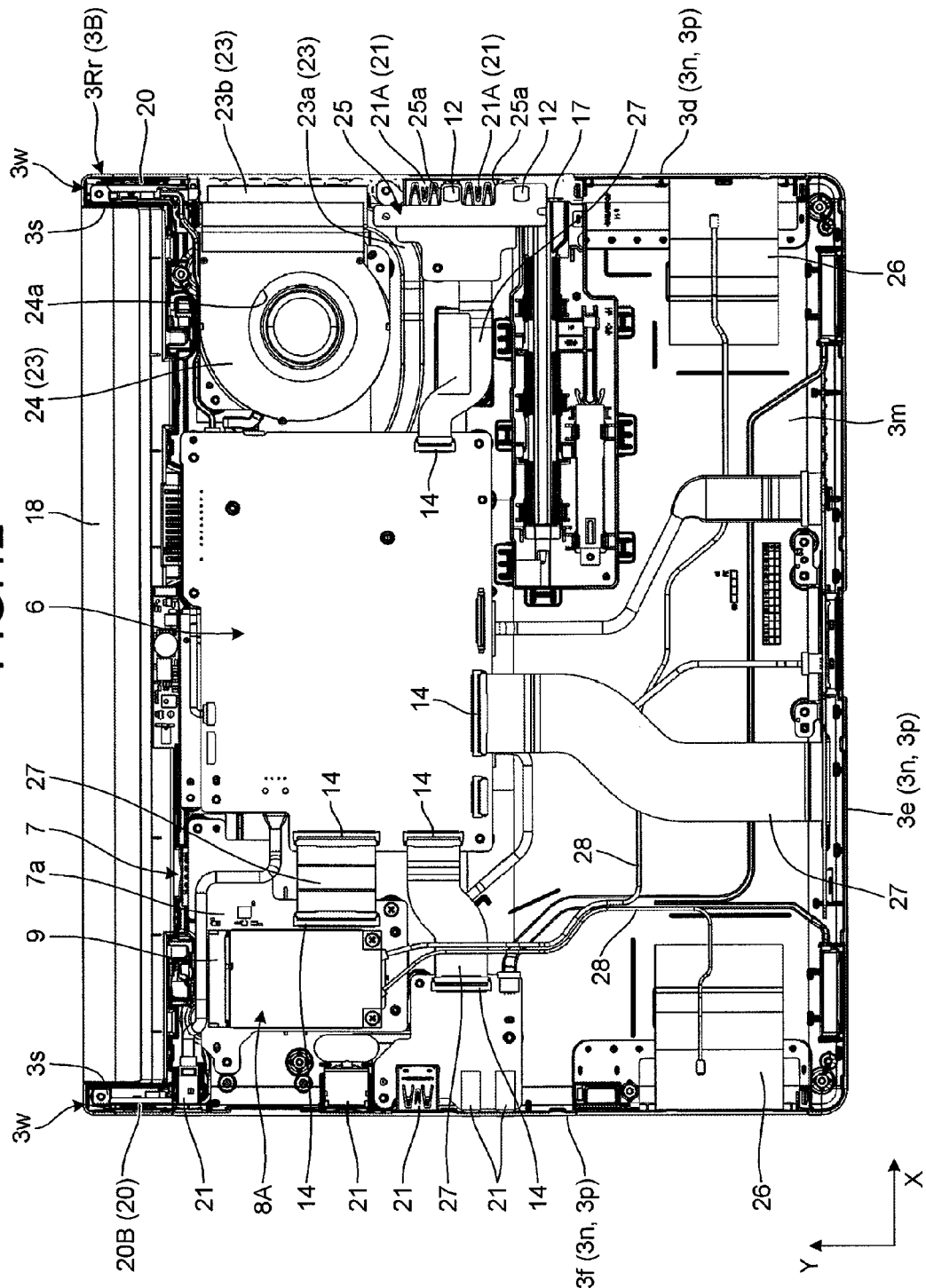
FIG. 12 is an exemplary plan view illustrating an example of the internal configuration of the electronic device in the second embodiment.

As illustrated in FIGS. 11, 12, and such, in the second embodiment, as an example, on the rear side (a reverse side, a back side, the wall 3m side, an opposite side to the display screen 4a) of the display device 4 in the housing 3B, and between the second member 3Rr and the third member 3Md, a plurality of substrates 6, 7, and 25 are housed. The substrates 6, 7, and 25 are arranged in positions different from one another and are all provided in parallel with the display device 4. Furthermore, the substrates 6, 7, and 25 are provided in a condition of being separated from the walls 3k, 3m, and 3n, more specifically, in a condition where space is formed with the respective walls 3k, 3m, and 3n. It is preferable that the substrates 6, 7, and 25 be arranged side-by-side along the display device 4, not overlapping with one another in the thickness direction of the housing 3B. The substrates 6, 7, and 25 are fixed to the housing 3B (the wall 3m or the wall 30a) with fixing tools, such as screws.

On the substrate 6 (a first board, a first circuit board, a control board, or a main board), for example, the plurality of electronic components 12 can be mounted (see FIG. 13, for example; only a part of the components are depicted in FIG. 13), such as a central processing unit (CPU), a graphic controller, power supply circuit components, a platform controller hub (PCH), a memory slot connector, an LCD connector, an input/output (I/O) connector, a power coil, elements, and connectors. The electronic components 12 include heating elements. On an electronic component 12 of a large heat value (a heating element), the cooling mechanism 23 can be provided. The cooling mechanism 23 comprises a heat sink (a heat receiving part, not depicted), a heat pipe 23a, a heat dissipating part 23b, and a fan 24. The substrate 6 and the electronic components 12 constitute at least a part of a control circuit (not depicted). Examples of the control circuit may include a video signal processing circuit, a tuner, a high-definition multimedia interface (HDMI) signal processor, an audio video (AV) input terminal, a remote control signal receiver, a controller, a selector, an on-screen display interface, a storage module (for example, a read only memory (ROM), a random access memory (RAM), and a hard disk drive (HDD)), and an audio signal processing circuit. The control circuit controls the output of video (for example, movies and still pictures) on the display screen 4a of the display device 4, the output of audio from a speaker (not depicted), light emission of a light emitting diode (LED, not depicted), and such. The display device 4, the speaker, and the LED are examples of output modules.

The substrate 7 and modules 8A and 8B have the same configuration as that in the above-described first embodiment. In the second embodiment, a first surface 7a of the substrate 7 and the module 8A are positioned on the display device 4 side, and a second surface 7b and the module 8B are positioned on the opposite side of the display device 4. The first surface 7a, the second surface 7b, and the modules 8A and 8B are arranged along the display device 4. On the substrate 25, the electronic components 12 are provided. In the housing 3B, flexible cables 27 are provided. The flexible cables 27 electrically connect among the substrates 6, 7, and 25, the display device 4, the connector 19, and such. The flexible cables 27 are electrically connected to corresponding connectors 14. The flexible cables 27 are, for example, flexible printed wiring boards and flat cables.

As illustrated in FIG. 12, in the housing 3B, a plurality of antennas 26 are housed. In the second embodiment, the plurality of antennas 26 connected with a single communication module (for example, the module 8B) are arranged separately from one another. In the second embodiment, as an example, one of the antennas 26 is arranged near the end 3d and the end 3e (near the corner 3h) of the housing 3B, while the other one of the antennas 26 is arranged near the end 3e and the end 3f (near the corner 3i) of the housing 3B. Accordingly, as an example, space diversity by the antennas 26 can be configured. The antennas 26 and the module 8B are electrically connected via cables 28. Furthermore, the function of the antennas 26 can be allotted such that one of the antennas 26 is assigned for transmitting and receiving while the other one of the antennas 26 is assigned for receiving only, or one of the antennas 26 can be used as a spare for the other one of the antennas 26.

As is clear from FIGS. 6 and 11, the substrates 6 and 7 and the cooling mechanism 23 are positioned in the thick second part 3Bb of the housing 3B. Accordingly, as an example, compared with when the substrates 6 and 7 and the cooling mechanism 23 are positioned in the thin first part 3Ba, it is easier to secure a wider space, and thus the cooling effect by the airflow flowed by the fan 24 of the cooling mechanism 23 can be obtained easily. In the second embodiment, the fan 24 and the heat dissipating part 23b are provided at the corner 3g where the end 3c and the end 3d are connected and that is positioned on the upper side in specified (controlled) use conditions. Therefore, as an example, regardless of the use positions of the electronic device 1B, the fan 24 and the cooling mechanism 23 can be arranged on the upper side in the housing 3B. Accordingly, as an example, heat is not likely to remain inside the housing 3B. The fan 24 and the heat dissipating part 23b are provided adjacent to the exhaust outlet 22b.

The substrate 7 is provided at the position where the substrate 6 is sandwiched with the cooling mechanism 23 (the positions in the second part 3Bb where the substrate 7, the substrate 6, and the cooling mechanism 23 are arranged in order of the foregoing). By such a configuration, the air taken in from the outside hits the substrate 7 before reaching the position of the substrate 6. Accordingly, as an example, the heat dissipation efficiency of the substrate 7 is improved. The substrate 7 mounted with the modules 8A and 8B is relatively heavy in weight out of the components in the housing 3B, and with respect to the substrate 6 positioned in the center of the housing 3B, is positioned on the opposite side of the cooling mechanism 23 that is another heavy component. Accordingly, as an example, the weight balance of the electronic device 1B becomes better. Consequently, as an example, when carrying the electronic device 1B, it is easier to hold for the user.

As illustrated in FIGS. 6 and 13, in the second embodiment, as an example, on the wall 3m of the housing 3B, an inlet 22a2 close to the fan 24, an inlet 22a3 positioned on the opposite side of the inlet 22a2 across the substrate 6, and the inlet 22a1 closer to the electronic components 12 as heat elements than the inlets 22a2 and 22a3 are provided. The inlet 22a2 being provided allows airflow to flow into the housing 3B more efficiently. Furthermore, an airflow S introduced from the inlet 22a3 is divided into an airflow S2 that flows towards the fan 24 along a second surface 6b on the rear side of the substrate 6 and an airflow S1 that passes through (goes around or detours) the outside of an end 6c of the substrate 6 positioned on the opposite side of the fan 24 and flows towards the fan 24 along a first surface 6a on the front side of the substrate 6. Consequently, the electronic components 12 (heating elements) provided to both the first surface 6a and the second surface 6b of the substrate 6 can be cooled.

Figure 14:
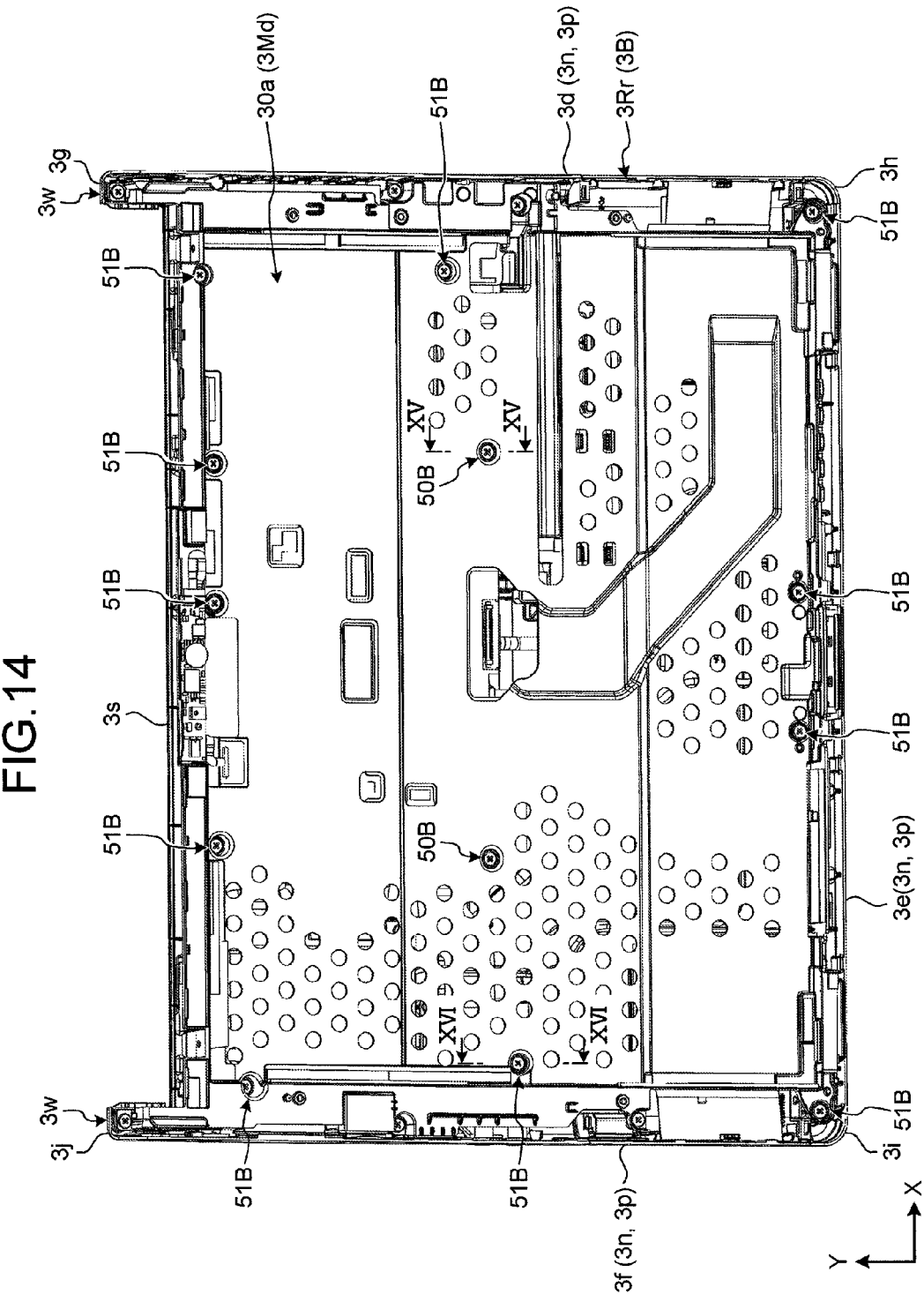
FIG. 14 is an exemplary plan view illustrating a connected portion of a second member and a third member of the electronic device in the second embodiment.

In the second embodiment, as an example, as illustrated in FIG. 14, in the housing 3B, the second member 3Rr (a housing member) and the third member 3Md (a housing member) are connected via fixing structures 50B similar to the fixing structure 50A in the first embodiment and connecting structures 51B similar to the connecting structure 51A in the first embodiment. Specifically, in the fixing structure 50B, the second member 3Rr (the wall 3m thereof) and the third member 3Md (the wall 30a thereof) are fixedly connected. In the connecting structure 51B, the second member 3Rr (the wall 3m thereof) and the third member 3Md (the wall 30a thereof) are connected to be movable (displaceable) relative to each other within a predetermined range. In the second embodiment, the wall 3m is an example of a first wall, and the wall 30a is an example of a second wall.

Also in the second embodiment, as an example, as illustrated in FIG. 14, the fixing structures 50B are positioned in a central portion in the frontal view (a central portion on the back side of the display screen 4a separated from the ends 3c to 3f and the corners 3g to 3j), and the connecting structures 51B are positioned on the sides towards the ends 3c to 3f or the corners 3g to 3i from the fixing structures 50B. Consequently, also in the second embodiment, as an example, the distance to the connecting structure 51B from the fixing structure 50B can be set relatively short, and thus, as an example, the displacement between the second member 3Rr and the third member 3Md in the connecting structure 51B is likely to be smaller.

Figure 15:
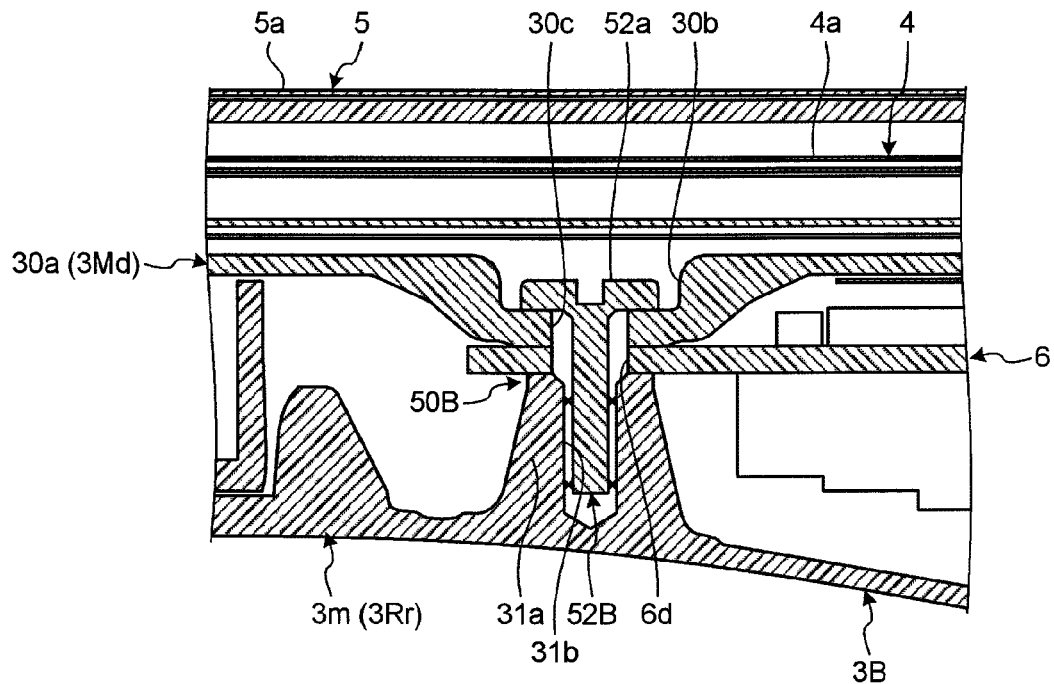
FIG. 15 is an exemplary cross-sectional view of the example of the electronic device in the second embodiment viewed along the line XV-XV in FIG. 14.

Also in the second embodiment, as an example, as illustrated in FIG. 15, in the fixing structure 50B, the wall 3m of the second member 3Rr and the wall 30a of the third member 3Md are fixed by a screw 52B as a connecting member. Furthermore, in the fixing structure 50B, the substrate 6 (a circuit board) is also fixed to the walls 3m and 30a. Specifically, on the wall 30a, the recessed portion 30b is provided, and at the bottom of the recessed portion 30b, the opening 30c is provided. The recessed portion 30b is sunk towards the opposite side of the display device 4. In other words, the recessed portion 30b is opened on the display device 4 side. The substrate 6 is provided with the openings 6d. The openings 6d, in the second embodiment, as an example, are provided at the ends (sides, edges, or corners) of the substrate 6. The openings 30c and 6d can be provided, for example, as through holes and cutouts. On the wall 3m, the projecting portion 31a is provided to project towards the display device 4 side (an inner side of the housing). On the projecting portion 31a, the female-threaded screw hole 31b is provided as a connecting portion. The screw 52B as a connecting member passes through the openings 30c and 6d and is connected to the female-threaded screw hole 31b provided to the projecting portion 31a as a connecting portion, thereby nipping the wall 30a and the substrate 6 between the head portion 52a of the screw 52B and the projecting portion 31a, whereby the wall 30a (the third member 3Md), the substrate 6, and the wall 3m (the second member 3Rr) are fixed. In the second embodiment, as an example, fixing the substrate 6 together with the second member 3Rr and the third member 3Md in the fixing structure 50B, as compared with a structure in which the substrate 6 is fixed separately, allows the structure to be more simplified. In the second embodiment, as an example, by utilizing the contact of the second member 3Rr, the third member 3Md, and the substrate 6 in the fixing structure 50B, the grounding portions of the second member 3Rr, the third member 3Md, and the substrate 6 can be electrically connected.

Figure 16:
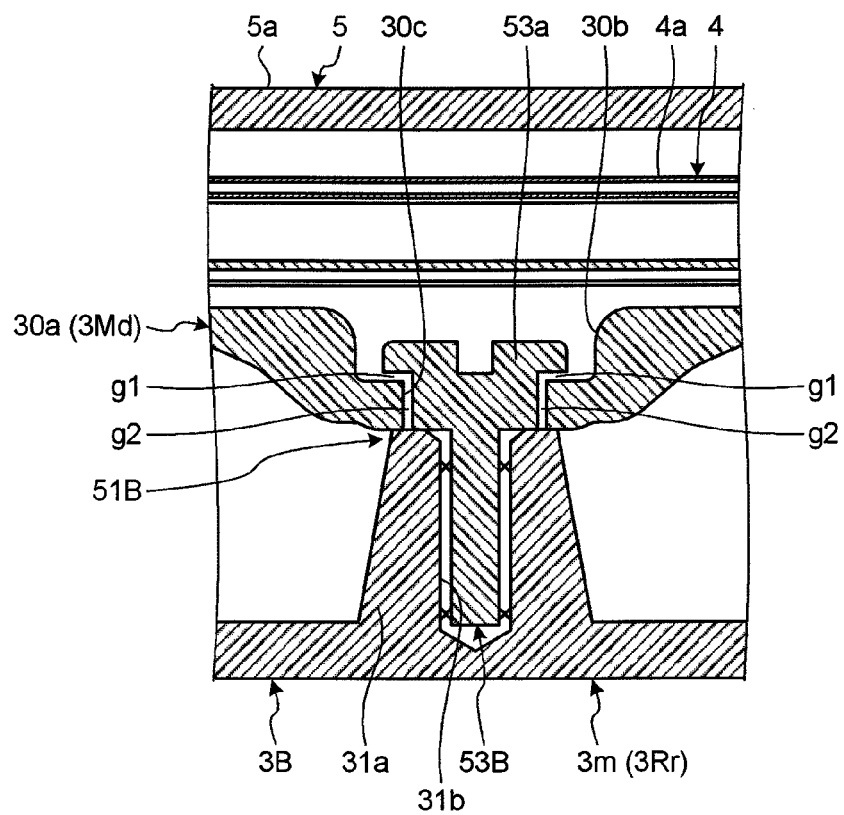
FIG. 16 is an exemplary cross-sectional view of the example of the electronic device in the second embodiment viewed along the line XVI-XVI in FIG. 14.

Meanwhile, in the second embodiment, as an example, as illustrated in FIG. 16, in the connecting structure 51B, the wall 3m of the second member 3Rr and the wall 30a of the third member 3Md are connected to be movable (displaceable) within a predetermined range by a screw 53B as a connecting member. Specifically, the recessed portion 30b is provided to the wall 30a, and at the bottom of the recessed portion 30b, the opening 30c is provided. The recessed portion 30b is sunk towards the opposite side of the display device 4. In other words, the recessed portion 30b is opened on the display device 4 side. On the wall 3m, the projecting portion 31a is provided to project towards the display device 4 side (an inner side of the housing). On the projecting portion 31a, the female-threaded screw hole 31b is provided as a connecting portion. The screw 53B as a connecting member passes through the opening 30c and is connected to the female-threaded screw hole 31b provided to the projecting portion 31a as a connecting portion. However, in the connecting structure 51B, without the screw 53B nipping the wall 30a, the head portion 53a of the screw 53B contacts the projecting portion 31a. In other words, the wall 30a is not nipped between the screw 53B and the projecting portion 31a, and the gaps g1 and g2 are provided between the screw 53B and the wall 30a. The gap g1 is a gap formed between the wall 3m (or the screw 53B fixed thereto) and the wall 30a in a direction along the walls 3m and 30a (a left-right direction in FIG. 16 or a direction along the display screen 4a). The gap g2 is a gap formed between the wall 3m (or the screw 53B fixed thereto) and the wall 30a in a direction crossing the walls 3m and 30a (an up-down direction in FIG. 16 or a direction crossing the display screen 4a (in an orthogonal direction as an example)). To the extent of the gaps g1 and g2, the wall 30a (the third member 3Md) can relatively move (move or displace relative to each other) with respect to the wall 3m (the second member 3Rr). In other words, the wall 30a (the third member 3Md) and the wall 3m (the second member 3Rr) are connected to be movable within the range of the gaps g1 and g2. In the connecting structure 51B, the screw 53B is an example of an engaging portion. Furthermore, the connecting structure 51B connects the wall 30a (the third member 3Md) and the wall 3m (the second member 3Rr) with some play.

As described in the foregoing, also in the second embodiment, the second member 3Rr and the third member 3Md that constitute a part of the housing 3B are connected via the fixing structures 50B similar to the fixing structure 50A in the first embodiment and the connecting structures 51B similar to the connecting structure 51A in the first embodiment. As a consequence, also in the second embodiment, the same effect as that in the first embodiment can be achieved.

First Modification

Figure 17:
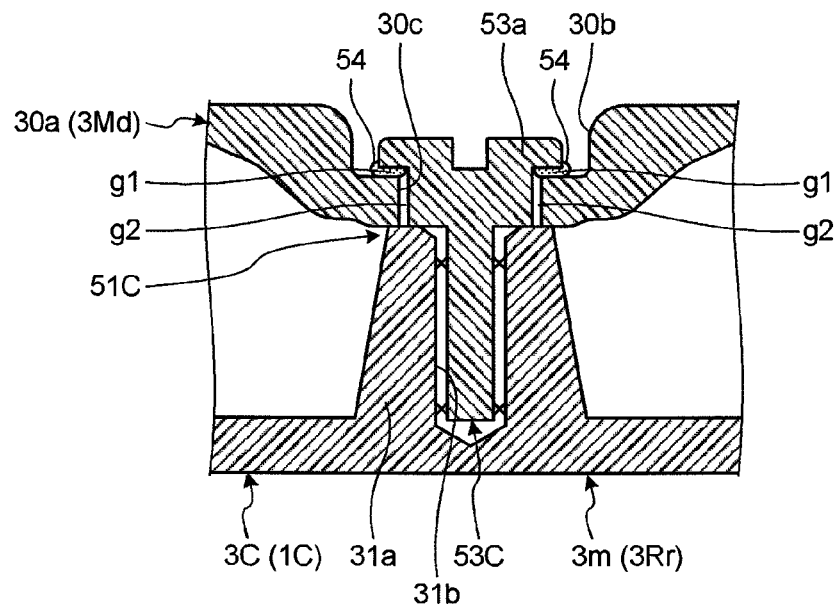
FIG. 17 is an exemplary cross-sectional view of a connecting structure (a second connecting structure) of an example of an electronic device according to a first modification in the second embodiment.

In a first modification, as an example, as illustrated in FIG. 17, a housing 3C comprises connecting structures 51C that are similar to the connecting structure 51A in the first embodiment and the connecting structure 51B in the second embodiment. However, in the first modification, a member 54 having electrical conductivity and elasticity (as an example, an O-ring, a C-ring, a packing, a gasket, and the like constructed with conductive rubber, conductive elastomer, and conductive resin materials) lies between a screw 53C and the wall 30a. The housing 3C (an electronic device 1C) according to the first modification is the same as that in the above-described embodiments, except that the connecting structures 51C replace the connecting structures 51A and 51B. With the connecting structure 51C in the first modification, while the connection of the walls 3m and 30a to be movable (displaceable) within a predetermined range is being realized, the grounding portions of the walls 3m and 30a can be electrically connected via the screw 53C and the member 54. In the connecting structure 51C, the walls 3m and 30a and the screw 53C are constructed with conductive materials, and the walls 3m and 30a, the screw 53C, and the member 54 are electrically connected by the contact of the walls 3m and 30a, the screw 53C, and the member 54 with one another.

Second Modification

Figure 18:
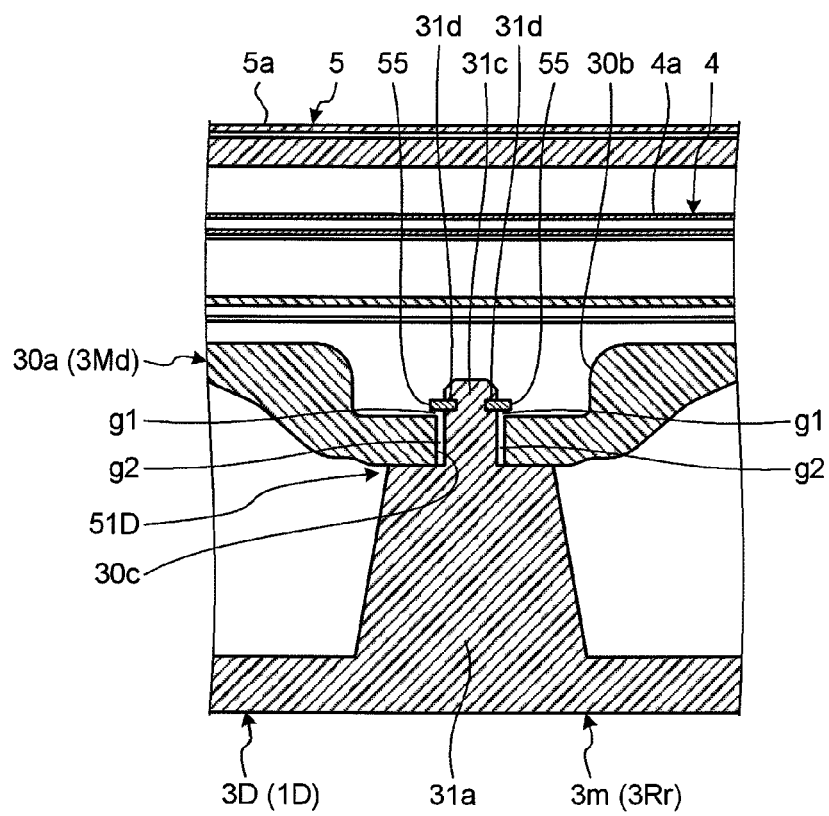
FIG. 18 is an exemplary cross-sectional view of a connecting structure (a second connecting structure) of an example of an electronic device according to a second modification in the second embodiment.

In a second modification, as an example, as illustrated in FIG. 18, a housing 3D comprises connecting structures 51D that are different from the connecting structures 51A, 51B, and 51C in the above-described embodiments and the modification. The housing 3D (an electronic device 1D) according to the second modification is the same as that in the above-described embodiments and the modification, except that the connecting structures 51D replace the connecting structures 51A, 51B, and 51C. Specifically, in the second modification, a boss 31c (protruding portion) further protruding from the tip of the projecting portion 31a is provided. The boss 31c passes through the opening 30c of the wall 30a. At the tip of the boss 31c on the opposite side to the projecting portion 31a, a groove 31d is provided, and in the groove 31d, a C-ring 55 (a retaining portion, an engaging portion, an engagement portion, or a catching portion) is inserted and attached. The C-ring 55 is fitted in the groove 31d after the boss 31c passes through the opening 30c. As is apparent from FIG. 18, between the boss 31c and the C-ring 55 and the circumferential portion of the opening 30c of the wall 30a, the gaps g1 and g2 are provided. In other words, in the present embodiment, as an example, by the boss 31c and the C-ring 55, an engaging portion similar to the screws 53A, 53B, and 53C in the above-described embodiments and the example is constructed. Accordingly, by the connecting structure 51D in the second modification, although the specific structure is different, the same effect as that of the connecting structures 51A, 51B, and 51C in the embodiments and the modification described above can be achieved.

Third Modification

Figure 19:
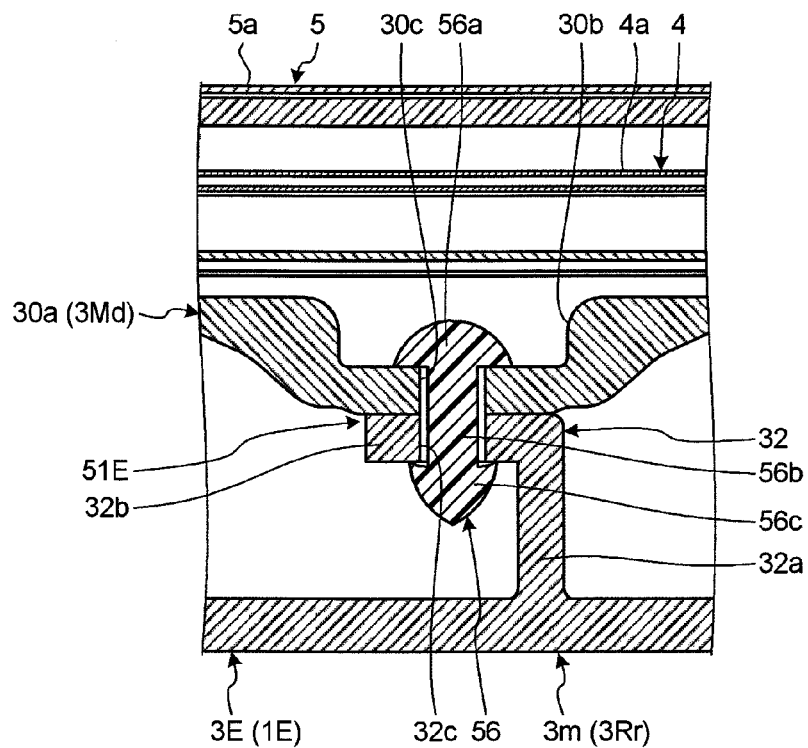
FIG. 19 is an exemplary cross-sectional view of a connecting structure (a second connecting structure) of an example of an electronic device according to a third modification in the second embodiment.

In a third modification, as an example, as illustrated in FIG. 19, a housing 3E comprises connecting structures 51E that are different from the connecting structures 51A to 51D in the above-described embodiments and the modifications. The housing 3E (an electronic device 1E) according to the third modification is the same as that in the above-described embodiments and the modifications, except that the connecting structures 51E replace the connecting structures 51A to 51D. Specifically, in the third modification, in place of the screws 53A, 53B, and 53C, the wall 3m and the wall 30a are connected to be movable (displaceable) by clips 56 as a connecting member having elasticity and flexibility. On the wall 3m, connecting portions 32 are provided. The connecting portion 32 comprises a wall portion 32a projecting from the wall 3m towards the wall 30a and a wall portion 32b that is bent on the tip side of the wall portion 32a and extending along the wall 3m. On the wall portion 32b, an opening 32c is provided. The clip 56 comprises a head portion 56a, a shaft portion 56b, and a claw portion 56c. The clip 56 penetrates through the openings 30c and 32c. In a condition of the clip 56 running through the openings 30c and 32c, the wall portion 32b (the wall 3m) and the wall 30a are nipped between the head portion 56a and the claw portion 56c of the clip 56. Because the clip 56 has elasticity and flexibility, as compared with when fixed by a screw, the wall 3m (the second member 3Rr) and the wall 30a (the third member 3Md) are likely to shift relative to each other by the action of external forces or the like. As a consequence, by the connecting structure 51E in the third modification, although the specific structure is different, the same effect as that of the connecting structures 51A to 51D in the above-described embodiments and the modifications can be achieved.

Fourth Modification

Figure 20:
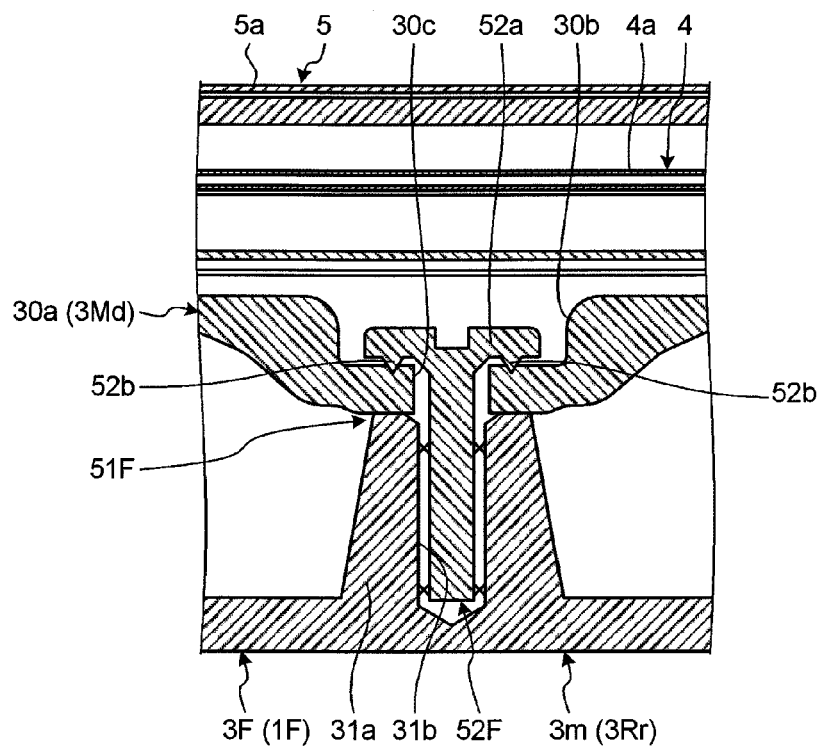
FIG. 20 is an exemplary cross-sectional view of a connecting structure (a second connecting structure) of an example of an electronic device according to a fourth modification in the second embodiment.

In a fourth modification, as an example, as illustrated in FIG. 20, in place of the connecting structures 51A to 51E, fixing structures 51F are provided. A housing 3F (an electronic device 1F) according to the fourth modification is the same as that in the above-described embodiments and the modifications, except that the fixing structures 51F replace the connecting structures 51A to 51E. Specifically, by a screw 52F as an example of a connecting portion, the wall 3m (the second member 3Rr) and the wall 30a (the third member 3Md) are fixed together more securely than the fixing structures 50A and 50B in the above-described embodiments and the modifications. More specifically, on the head portion 52a of the screw 52F, bosses 52b (claws) are provided to protrude toward a bearing surface of the wall 30a. By tightening the screw 52F to the wall 30a, the bosses 52b cut into the wall 30a, whereby the shift (movement, displacement, relative displacement) between the screw 52F and the wall 30a is suppressed, and eventually, the shift (movement, displacement, relative displacement) between the wall 3m (the second member 3Rr) and the wall 30a (the third member 3Md) is suppressed. With the configuration of the fourth modification, when two of the members constituting the housing 3F are fixed at a plurality of places, a minute displacement between the two members in at least one of the fixing portions caused by external forces, heat, residual stress, and such applied afterwards is suppressed. Consequently, the deflection caused by such displacement on at least one of the two members is suppressed, and thus the distortion (bends, irregularities, and the like) caused on the housing 3F is suppressed.

Fifth Modification

Figure 21:
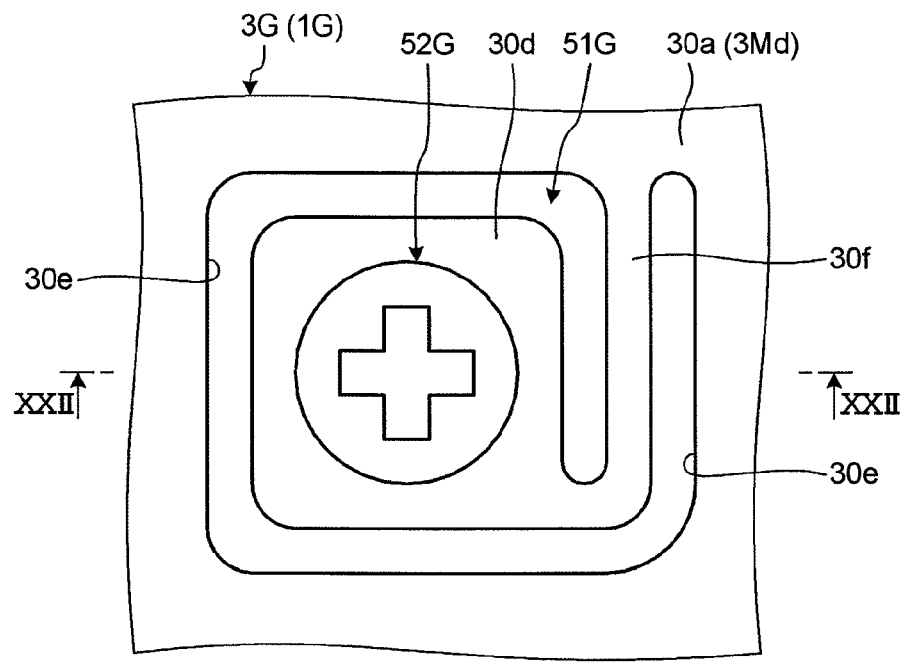
FIG. 21 is an exemplary plan view of a connecting structure (a second connecting structure) inside a housing of an example of an electronic device according to a fifth modification in the second embodiment.
Figure 22:
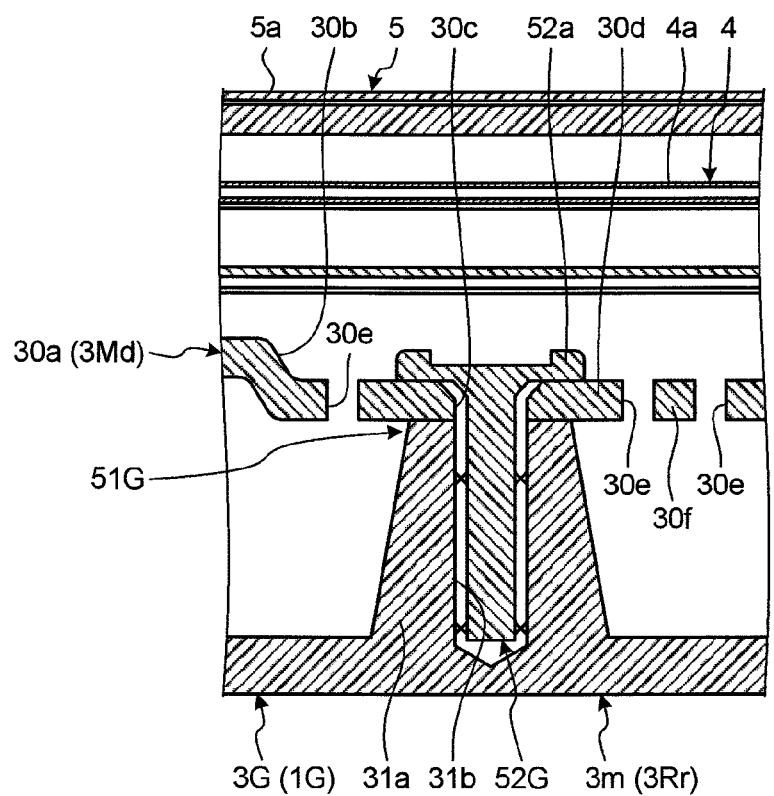
FIG. 22 is an exemplary cross-sectional view of the example of the electronic device viewed along the line XXII-XXII in FIG. 21 in the fifth modification.

In a fifth modification, as an example, as illustrated in FIGS. 21 and 22, connecting structures 51G replace the connecting structures 51A to 51E and the fixing structure 51F in the above-described embodiments and the modifications. A housing 3G (an electronic device 1G) according to the fifth modification is the same as that in the above-described embodiments and the modifications, except that the connecting structures 51G replace the connecting structures 51A to 51E and the fixing structure 51F. Specifically, between a connecting portion 30d of the wall 30a connecting to the projecting portion 31a (the wall 3m, or the second member 3Rr) by a screw 52G as a connecting member and the wall 30a, an opening 30e is provided, and by the opening 30e, a deformable arm portion 30f (a deforming portion) is provided between the connecting portion 30d and the wall 30a. The arm portion 30f may deform elastically or may deform plastically. As a consequence, by the connecting structure 51G in the fifth modification, although the specific structure is different, the same effect as that of the connecting structures 51A to 51E in the embodiments and the modifications can be achieved.

While the exemplary embodiments and the modifications of the present invention are described in the foregoing, the above-described embodiments and the modifications are illustrative only. The invention is not restricted to the above-described embodiments and the modifications, and various modifications can be made. For example, the invention can be applied to an electronic device which has no member covering the edge of the display device (the first member 3Fr in the embodiment). In this case, for example, it can be said that the display device can as well serve as a cover. Furthermore, in this case, for example, the electronic device is provided with a first housing comprising a first wall facing an opposite side to the display screen of the display device and a second housing comprising a second wall facing the opposite side to the display screen of the display device, and the second wall is positioned between the first wall and the display device. The invention can be implemented by various embodiments of fixing portions and connecting portions. Furthermore, the technical characteristics of each of the embodiments and the modifications can be implemented in an appropriate combination. Moreover, the specifications (construction, type, direction, shape, size, length, width, thickness, height, number of pieces, arrangement, position, material, and such) of each of the constituent elements can be implemented with appropriate changes.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television receiver comprising:
    a display device comprising a display screen and an edge at an area other than the display screen;
    a first wall being a rear face of the display device positioned at a side opposite of the display screen;
    a second wall positioned between the first wall and the display device, the second wall covering a rear face of the display screen of the display device;
    a substrate mounted with an electronic component and supported between the first wall and the second wall;
    a fixing portion fixing the second wall and an end of the substrate together on first projecting portions provided on a position on the first wall at which the substrate is provided; and
    a connecting portion connecting an end of the second wall to a plurality of second projecting portions provided at four corners of the first wall, the connecting portion provided with a gap between a head portion of a screw contact and an attached opening of the second wall, the head portion of the screw contacting the projecting portion.

2. An electronic device comprising:
    a housing, a display device, and a touch panel covering the display device being provided at a surface side of the housing;
    a first wall being a rear face of the display device positioned at a side opposite of the display screen;
    a second wall positioned between the first wall and the display device, the second wall covering a rear face of the display screen of the display device;
    a substrate mounted with an electronic component and supported between the first wall and the second wall;
    a fixing portion fixing the second wall and an end of the substrate together on first projecting portions provided on a position on the first wall at which the substrate is provided; and
    a connecting portion connecting an end of the second wall to a plurality of second projecting portions provided at four corners of the first wall, the connecting portion provided with a gap between a head portion of a screw contact and an attached opening of the second wall, the head portion of the screw contacting the projecting portion.

3. The television receiver of claim 1, wherein the fixing portion comprises a fixed screw inserted in a first opening provided at the second wall and a second opening provided at an end of the substrate in a position of the fixing portion, the fixed screw fixing the second wall and the end of the substrate together.

4. The television receiver of claim 3, wherein the first opening is provided at a first recessed surface provided at the second wall and the first recessed surface is sunk towards the opposite side of the display device.

5. The television receiver of claim 1, wherein the attached opening is provided at a second recessed surface provided at the second wall in a position of the connecting portion and the second recessed surface is sunk towards the opposite side of the display device.

6. The electronic device of claim 2, wherein the fixing portion comprises a fixed screw inserted in a first opening provided at the second wall and a second opening provided at an end of the substrate in a position of the fixing portion, the fixed screw fixing the second wall and the end of the substrate together.

7. The electronic device of claim 6, wherein the first opening is provided at a first recessed surface provided at the second wall and the first recessed surface is sunk towards the opposite side of the display device.

8. The electronic device of claim 2, wherein the attached opening is provided at a second recessed surface provided at the second wall in a position of the connecting portion and the second recessed surface is sunk towards the opposite side of the display device.

* * * * *